(12) United States Patent
Cruz

(10) Patent No.: US 10,481,595 B2
(45) Date of Patent: Nov. 19, 2019

(54) METHOD AND APPARATUS FOR ASSESSING THE COLLECTIVE HEALTH OF MULTIPLE PROCESS CONTROL SYSTEMS

(71) Applicant: FISHER-ROSEMOUNT SYSTEMS, INC., Round Rock, TX (US)

(72) Inventor: Rovertzonn C. Cruz, Leander, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 47 days.

(21) Appl. No.: 15/722,171

(22) Filed: Oct. 2, 2017

(65) Prior Publication Data

US 2018/0074483 A1   Mar. 15, 2018

Related U.S. Application Data

(63) Continuation-in-part of application No. 14/875,336, filed on Oct. 5, 2015.

(51) Int. Cl.
*G05B 23/02* (2006.01)
*G06Q 10/00* (2012.01)

(52) U.S. Cl.
CPC ................ *G05B 23/0216* (2013.01)

(58) Field of Classification Search
None
See application file for complete search history.

(56) References Cited

U.S. PATENT DOCUMENTS

| | | | |
|---|---|---|---|
| 6,571,285 B1 | 5/2003 | Groath et al. | |
| 6,633,782 B1 | 10/2003 | Schleiss et al. | |
| 6,801,920 B1 | 10/2004 | Wischinski | |
| 6,813,532 B2 | 11/2004 | Eryurek et al. | |
| 6,965,806 B2 | 11/2005 | Eryurek et al. | |
| 6,985,779 B2 | 1/2006 | Hsiung et al. | |
| 7,020,875 B2* | 3/2006 | Zweifel | G06F 8/61 707/999.003 |

(Continued)

FOREIGN PATENT DOCUMENTS

| | | |
|---|---|---|
| EP | 1 566 757 A1 | 8/2005 |
| EP | 3 156 871 A1 | 4/2017 |

(Continued)

OTHER PUBLICATIONS

Guardian Whitepaper, Steps to Improving Your System Health Score, Oct. 2014, © Emerson Process Management.

(Continued)

*Primary Examiner* — Isaac T Tecklu
(74) *Attorney, Agent, or Firm* — Marshall, Gerstein & Borun LLP

(57) ABSTRACT

Assessing a collective health score of a plurality of process control systems includes automatically and periodically assessing a risk for each of the process control systems, scoring the health of each process control system within a health score scale fixed by an upper limit and a lower limit, the health score based on the assessed risk for each process control system, enabling a user to select a menu item within a navigation menu to specify higher and lower levels of integration of the health scores, and presenting a collective health score of the process control systems associated with the selected menu item.

34 Claims, 21 Drawing Sheets

(56) References Cited

U.S. PATENT DOCUMENTS

| | | | |
|---|---|---|---|
| 7,031,880 B1 | 4/2006 | Seem et al. | |
| 7,130,701 B1 | 10/2006 | Wischinski | |
| 7,203,560 B1 | 4/2007 | Wylie et al. | |
| 7,239,977 B2* | 7/2007 | Fantana | G06Q 10/06 702/185 |
| 7,328,078 B2* | 2/2008 | Sanford | G05B 23/0245 700/108 |
| 7,346,404 B2 | 3/2008 | Eryurek et al. | |
| 7,356,377 B2* | 4/2008 | Schwarm | G05B 23/0294 700/108 |
| 7,557,702 B2* | 7/2009 | Eryurek | G05B 23/027 340/511 |
| 7,698,242 B2* | 4/2010 | Van Camp | G05B 15/02 700/108 |
| 7,890,870 B1* | 2/2011 | Metters | H04L 67/36 715/736 |
| 10,026,045 B1* | 7/2018 | Portnoy | G06Q 10/063114 |
| 2002/0010562 A1* | 1/2002 | Schleiss | G05B 23/0227 702/183 |
| 2002/0046221 A1 | 4/2002 | Louis Wallace et al. | |
| 2002/0059093 A1* | 5/2002 | Barton | G06Q 10/06 705/7.39 |
| 2002/0077711 A1* | 6/2002 | Nixon | C10G 11/187 700/51 |
| 2002/0123864 A1* | 9/2002 | Eryurek | G05B 23/0254 702/188 |
| 2002/0163427 A1 | 11/2002 | Eryurek et al. | |
| 2002/0174264 A1 | 11/2002 | Fuller et al. | |
| 2003/0088319 A1* | 5/2003 | Kanai | H04L 41/069 700/9 |
| 2004/0139085 A1* | 7/2004 | Eryurek | G05B 19/418 |
| 2004/0153412 A1 | 8/2004 | Fischer et al. | |
| 2004/0186927 A1* | 9/2004 | Eryurek | G05B 15/02 710/12 |
| 2004/0213384 A1 | 10/2004 | Alles et al. | |
| 2005/0010323 A1 | 1/2005 | Cocciadiferro et al. | |
| 2005/0033866 A1* | 2/2005 | Besson | G06F 8/65 710/1 |
| 2006/0064486 A1* | 3/2006 | Baron | H04L 41/0886 709/224 |
| 2006/0101457 A1* | 5/2006 | Zweifel | G06F 8/65 717/174 |
| 2007/0143450 A1* | 6/2007 | Kruse | G05B 19/418 709/220 |
| 2007/0244584 A1 | 10/2007 | John et al. | |
| 2007/0293977 A1* | 12/2007 | Galt | B22D 17/32 700/204 |
| 2007/0299706 A1* | 12/2007 | Galt | B22D 17/32 705/7.11 |
| 2009/0158189 A1* | 6/2009 | Itani | G06Q 10/06 715/772 |
| 2010/0131473 A1* | 5/2010 | Bjork | G06F 11/3006 707/690 |
| 2010/0131939 A1* | 5/2010 | Hieb | G06F 8/73 717/169 |
| 2010/0274789 A1* | 10/2010 | Grace | G06Q 10/06 707/748 |
| 2012/0265323 A1* | 10/2012 | Sentgeorge | B82Y 5/00 700/29 |
| 2013/0103453 A1* | 4/2013 | Hoagland | G06Q 10/06 705/7.25 |
| 2013/0212440 A1* | 8/2013 | Rom | G06F 11/0709 714/47.1 |
| 2014/0039833 A1* | 2/2014 | Sharpe, Jr. | G05B 23/0229 702/183 |
| 2014/0156225 A1* | 6/2014 | Dagnino | G01M 99/00 702/183 |
| 2014/0324519 A1* | 10/2014 | Dennis | G06Q 10/0635 705/7.28 |
| 2015/0149240 A1* | 5/2015 | Madiraju | G06Q 10/0635 705/7.28 |
| 2015/0333988 A1* | 11/2015 | Jalan | H04L 43/0817 709/224 |
| 2016/0363928 A1* | 12/2016 | Seo | G05B 23/0221 |
| 2017/0097623 A1 | 4/2017 | Van Camp et al. | |
| 2017/0102695 A1* | 4/2017 | Hilemon | G05B 23/0264 |
| 2017/0235662 A1* | 8/2017 | Leask | G06F 8/77 717/125 |

FOREIGN PATENT DOCUMENTS

| | | |
|---|---|---|
| EP | 3 373 090 A2 | 9/2018 |
| WO | WO-02/079884 A1 | 10/2002 |
| WO | WO-02/097545 A1 | 12/2002 |
| WO | WO-03/075206 A2 | 9/2003 |
| WO | WO-2007/121227 A2 | 10/2007 |

OTHER PUBLICATIONS

Search Report for Application No. GB1815500.2, dated Mar. 19, 2019.

* cited by examiner

| | For Review | In-Progress | Action Complete / Not Applicable | | | | |
|---|---|---|---|---|---|---|---|
| ☐ KBA Number | System Behavior | Applicability / Likelihood | Recovery / Workaround | Avoidance / Resolution | Affected Nodes | User Notes | |
| AP-0700-0046<br>☐ Published: 07 Sep 2010 | Short circuit might occur on a railbus using 8-Wide vertical I/O carrier or single/dual cable extender for 8-Wide horizontal carrier, disrupting railbus communications. | May occur on all VE4050 DeltaV 8-wide carriers and single/dual cable extender PN 12P3368 (left side) | None available | Install the new plastic pin protector. Contact Emerson Process Management Sales office or your Local Business Partner to order the plastic pin protector KJ4010X1-BV1. | 1 | ☐ Verified we do not have these carriers in service. ☐ Discovered we don't have them in spares inventory either, but as a precaution I obtained some of the protectors from our local Emerson office. ☐ Closing out this KBA in Guardian. | |

FIG. 9

| Notification Settings | | | | | |
|---|---|---|---|---|---|
| General | Knowledge Base Articles | | | | ⓘ |
| Subscriptions - KBA | Notification Type | No Email | My System | My Location | Enterprise Wide |
| Subscriptions - Support | Knowledge Base Articles | | | | |
| Subscriptions - Updates | Product Safety Notice | ○ | ○ | ○ | ◉ |
| Subscriptions - System | Security | ○ | ○ | ◉ | ○ |
| | Process | ○ | ◉ | ◉ | ○ |
| | As Needed | ○ | ◉ | ○ | ○ |
| | Informational | ○ | ○ | ○ | ○ |

FIG. 15

METHOD AND APPARATUS FOR ASSESSING THE COLLECTIVE HEALTH OF MULTIPLE PROCESS CONTROL SYSTEMS

RELATED APPLICATIONS

This application is a regular filed application that is a Continuation-In-Part of U.S. application Ser. No. 14/875,336, entitled "Method And Apparatus For Negating Effects Of Continuous Introduction Of Risk Factors In Determining The Health Of A Process Control System," which was filed on Oct. 5, 2015, the entire disclosure of which is hereby expressly incorporated by reference herein.

TECHNICAL FIELD

This disclosure relates generally to remotely monitoring process control systems, and, more particularly, to peer-based scoring of the overall health of a process control system.

BACKGROUND

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Typically, a process control system operates within an enterprise that may include several process plants, component and/or service suppliers and customers, all of which may be distributed throughout a large geographic area, or in some cases, throughout the world. The process plants, suppliers and customers may communicate with each other using a variety of communication media and technologies or platforms such as, for example, the Internet, satellite links, ground-based wireless transmissions, telephone lines, etc. Of course, the Internet has become a preferred communication platform for many enterprises because the communications infrastructure is established, making the communication infrastructure costs for an enterprise near zero, and the technologies used to communicate information via the Internet are well-understood, stable, secure, etc.

Each process control plant within an enterprise may include one or more process control systems as well as a number of other business-related or information technology systems, which are needed to support or maintain or which are complementary to the operation of the process control systems. In general, the information technology systems within a process control plant may include manufacturing execution systems such as, for example, a maintenance management system and may also include enterprise resource planning systems such as, for example, scheduling, accounting and procurement systems. Although these information technology systems may be physically located within or near a plant, in some cases a few or possibly all of these systems may be remotely located with respect to the plant and may communicate with the plant using the Internet or any other suitable communication link. System engineers and other personnel responsible for maintaining the hardware and software associated with the process control system may be subject to travel to the different plant sites. Moreover, maintaining hardware and software at even a single process control system is an arduous task.

Independent remote maintenance systems have been developed to remotely monitor process control systems, including multiple process control systems within an enterprise, and process control systems for multiple enterprises. An example of a remote maintenance system is disclosed in U.S. Pat. No. 7,698,242 entitled "Systems and Method to Maintain Process Control Systems Using Information Retrieved From a Database Storing General-Type Information and Specific-Type Information," the contents of which are expressly incorporated by reference herein. In particular, the remote maintenance systems help maintain the hardware and software of the process control system by identifying, and informing the system engineers of, various risk factors (also referred to as risk indicators) relevant to the process control system, such as, for example, knowledge base articles (KBAs) describing issues the process control system may encounter, software updates (e.g., hotfixes, security, etc.), action alerts, service call activities, and hardware/software product lifecycles (e.g., age, version, backwards compatibility, forward compatibility, etc.). Thus, the system engineer is informed of potential risks to the availability, reliability and security of the process control system, thereby helping the system engineer to undertake preventative actions to avoid problems with the process control system, as well as alleviate the burden of travelling from one site to another.

Of course, it remains the responsibility of the system engineer or other appropriate maintenance personnel to read a knowledge base article, install a software update, close an open action alert or close an open service call in order to address the risks to the process control system. However, due to the complexity of many of these process control systems, the system engineer is often inundated with numerous KBAs, software updates, action alerts, service calls, product lifecycles and other risk factors each day. As these risk factors accumulate, the overall risk to the process control system increases and the overall health of the process control system degrades. At a personnel level, the system engineers or other maintenance personnel would sometimes need motivation to take preventative measures, rather than reactionary measures.

In order to address this problem, the remote maintenance systems objectively scored the health of each process control system based on the KBAs, software updates, action alerts, service calls, product lifecycles and other risk factors for that process control system. For example, unread KBAs, uninstalled software updates, open action alerts, open service calls and obsolete, unsupported hardware/software would decrease a process control system's health score, whereas read KBAs, installed software updates, closed (or undertaken) action alerts, closed (or undertaken) service calls and current or actively supported hardware/software would increase the health score. Generally speaking, the total number of risk factors were added and scaled to fixed range (e.g., between 1 and 10). This health score, and the website, were updated periodically (e.g., daily) as new risk factors arose.

The remote maintenance systems further supported a secure support website using a portal type of webpage providing links to the health score, risk factors, maintenance information, maintenance features and maintenance services for the process control system provided by the remote monitoring system. For example, each process control system was registered with the remote maintenance system which included configuration information associated with process control systems monitored by the remote maintenance system. The configuration information could include field device information, software information, firmware information, operational status information, maintenance information, lifecycle information, etc. associated with hardware, software, and/or firmware used to implement the components and devices of monitored process control systems. The remote maintenance system would thereby know the (typically unique) configuration of each registered process control system, including the process control system's content, such as software, hardware, licenses, applied software updates, software versions, etc., and match the process control system's content to relevant risk factors. Once registered, a system engineer could access the website from a workstation, tablet, smartphone or other computing device in order to view information about the process control system, including the health score.

Furthermore, the support website allowed the system engineer to update the status of any risk factors identified by the remote maintenance system. For example, the website may allow the system engineer to note that a KBA has been read, a software update has been installed, an action alert has been closed, a service call has been closed, etc. Alternatively, the remote maintenance system could automatically detect when a KBA is read (e.g., detect when the file has been opened or downloaded), when a software update has been installed (e.g., the update has been downloaded or installation executed), or when an action alert or service call has been closed (e.g., status of the process control system's or enterprise's internal maintenance support system indicates a work team has address the problem, parts have been ordered, a work order has been generated, etc.). Thus, the remote maintenance system would know whether a risk factor had been eliminated (e.g., the risk was addressed). A more detailed explanation of an exemplary support website is provided in U.S. Pat. No. 7,698,242 referred to above.

However, despite this attempt to motivate system engineers to take preventative measures to address risks to the process control system and avoid problems, the health scores were largely ignored, because process control system health management, in terms of the systematic elimination of risks to system reliability, security and performance, was/is an ongoing process. For example, Microsoft® regularly issues new security updates for its products, which, in turn, are tested by Emerson Process Management for compatibility with its process control systems, such as the DeltaV™ control system, sold by Emerson Process Management. In addition, service calls received from process control systems, which included process control systems worldwide, would be evaluated by the remote maintenance system, which, in turn, would lead to new or revised KBAs and/or software updates. Over longer periods of time, advances in technology led to new operating systems, new computers, new hardware and software offerings, which made their way into existing systems through expansions, migrations and modernization projects. In short, the change for a process control system is constant, which creates a backlog to risk elimination activity as new risk factors were introduced daily. This made it nearly impossible for a process control system to receive an acceptable health score, despite a system engineer's best efforts. New risk factors would be continuously introduced even before a system engineer had sufficient opportunity to address and eliminate them, which drove down the health score for the process control system. In turn, this led the system engineer to ignore the health score, and to underutilize the remote maintenance system, which led to an even greater backlog of risk factors and risk elimination activities. Thus, there is a need for an effective, sustained and measurable process control system health management.

Furthermore, a remote maintenance system typically monitors the process control systems of enterprises of varying size and geographic scope. While a system engineer of an enterprise may be primarily responsible or interested in monitoring a particular process control system and/or location, other enterprise personnel, including upper level engineers and business people, may be interested in monitoring process control systems at a higher level, which entails multiple process control systems over larger geographic scopes. In some cases, an enterprise only has one or a few process control systems, in which case it is relatively simple to monitor the process control systems individually. In other cases, an enterprise may have dozens or hundreds of process control systems spread globally, in which case it is difficult to monitor the process control systems individually. Currently, it is not possible to assess the overall collective health of multiple process control systems, much less view the collective health of multiple process control systems at varying levels of integration. Thus, there is a further need for a technique to monitor multiple process control systems at higher and lower levels in a more concise and efficient manner so as to assess the health of process control systems at various levels of integration.

SUMMARY

A technique for assessing the health of multiple process control systems uses the concept of collective health scores for numerous process control systems at various levels of integration, including enterprise level, world area, location and product line. Beginning at the enterprise level, a user may view a collective health score for all process control systems within the enterprise worldwide to gauge the overall health of the process control systems at a high level without having to view each process control system individually. Drilling down to the world area level, a user may view a collective health score for all process control systems of the enterprise within a defined geographic scope (e.g., North America, Europe, Latin America, etc.). Drilling down further to a location level, a user may view a collective health score for all process control systems at a defined location of the enterprise (e.g., Austin, Tex. plant, Melbourne plant, etc.). Still further, a user may drill down to view the collective health score for process control systems according to product line (e.g., DeltaV™, AMS Device Manager, Syncade™, etc.) at higher and lower levels of integration. The collective health score for multiple process control systems may be determined as an average of the aggregate of the individual health score for each process control system. In some cases, the individual health scores may be weighted according to the criticality or importance of a process control system within the selected level of integration. For example, process control systems may be measured by size (e.g., by number of input device signal tags, by number of device tags, by number of devices, etc.), such that process control systems of a larger size are deemed more critical or important to the collective health score of multiple process control systems, than process control systems of a smaller size.

In one case, a method of assessing a collective health of a plurality of process control systems includes automatically and periodically assessing a risk for each of a plurality of process control systems. Each process control system has one or more risk factors associated with the process control system, and the introduction of a risk factor to a process control system each period increases the risk assessment for that process control system, and the elimination of a risk factor from a process control system each period decreases the risk assessment for that process control system. The method further scores the health of each process control system within a health score scale. The health score scale is fixed by an upper limit and a lower limit, and the health score based on the assessed risk for each process control system. The method displays an integrated navigation menu having selectable menu items specifying higher and lower levels of integration of the health scores, and an information view associated with the navigation menu. A user is then enabled to select one of the selectable menu items within the navigation menu to specify higher and lower levels of integration of the health scores. The method presents a collective health score of the process control systems associated with the selected menu item in the information view in a format for each of the different selectable menu items specifying the higher and lower levels of integration of the health scores. The format is a common display format for presenting the collective health scores of the process control systems associated with each of the selectable menu items specifying the higher and lower levels of integration of the health scores.

In another case, an apparatus for assessing a collective health of a plurality of process control systems includes a server, an interface in communication with the server, a communication interface, and processor in communication with the interface, the server and the communication interface. The servers is adapted to register a process control system and other process control systems to facilitate maintaining the process control systems. The process control system is located at a first plant site geographically separate from other plant sites of other process control systems. The interface is adapted to retrieve risk factors from a database in communication with the server based on monitoring of the process control systems. The communication interface is adapted to communicate risk factors to the process control systems. Each process control system has one or more risk factors associated with the process control system. The processor is adapted to automatically and periodically score the health of each process control system within a health score scale based on the assessed risk for each process control system, display an integrated navigation menu having a plurality of selectable menu items, display an information view associated with the navigation menu, enable a user to select one of the plurality of selectable menu items, and present a collective health score of the process control systems associated with the selected menu item in the information view. The health score scale is fixed by an upper limit and a lower limit. The selectable menu items specify higher and lower levels of integration of the health scores. The information view is presented in a format for each of the different selectable menu items specifying the higher and lower levels of integration of the health scores, and the format is a common display format for presenting the collective health scores of the process control systems associated with each of the selectable menu items.

If desired, the same risk factor introduced to each of the plurality of process control system in a period does not affect the health score of any of the plurality of process control systems. If also desired, the elimination of a risk factor from a process control system in a period has more of an effect on the health score for a process control system scored towards the center of the health score scale the previous period than for a process control system scored towards the upper and lower limits of the health score scale the previous period.

In an example, each process control system is located at a plant site geographically separate from other plant sites of the plurality of other process control systems, and a level of integration is a geographical area. If desired, presenting a collective health score of the process control systems associated with the selected menu item in the information view involves presenting a collective health score of the process control systems within the selected geographical area.

In another example, each process control system is a member of a product family of process control systems from a manufacturer. The process control systems are of two or more different product families, and a level of integration is a product family. If desired, presenting a collective health score of the process control systems associated with the selected menu item in the information view involves presenting a collective health score of the process control systems of the same selected product family.

In a further example, each process control system is a member of an enterprise. The process control systems are of two or more different enterprises, and a level of integration is an enterprise. If desired, presenting a collective health score of the process control systems associated with the selected menu item in the information view involves presenting a collective health score of the process control systems of the same selected enterprise.

In yet another example, each process control system is a member of the same enterprise, and a level of integration comprises the enterprise. Presenting a collective health score of the process control systems associated with the selected menu item in the information view involves presenting a collective health score of the process control systems of the enterprise.

In still another example, each process control system is a member of a business industry. The process control systems are of two or more different business industries, and a level of integration comprises a business industry. If desired, presenting a collective health score of the process control systems associated with the selected menu item in the information view involves presenting a collective health score of the process control systems of the same business industry.

In yet a further example, the collective health score is an average of the health scores of the process control systems associated with the selected menu item. If desired, the health score may be weighted for each process control system, and the average collective health score involves a weighted average. If desired, weighting the health score for each process control system involves weighting the health score for each process control system according to the number of input device signal tags of controllers across the process control system, weighting the health score for each process control system according to the number of input device signal tags of controllers across the process control system, weighting the health score for each process control system according to the number of device tags within the process control system, comprises weighting the health score for each process control system according to the number of devices within the process control system, and/or weighting the health score for each process control system according to a value assigned by a user of the process control system.

BRIEF DESCRIPTION OF THE DRAWINGS

FIG. 9 is a graphical user interface of an example tracking screen that may be used to display the status of risk factors for a process control system of FIG. 2;

FIG. 15 is a graphical user interface of an example notification screen that may be used to receive automatic notifications of risk factors for a process control system of FIG. 2;

DETAILED DESCRIPTION

Figure 1:
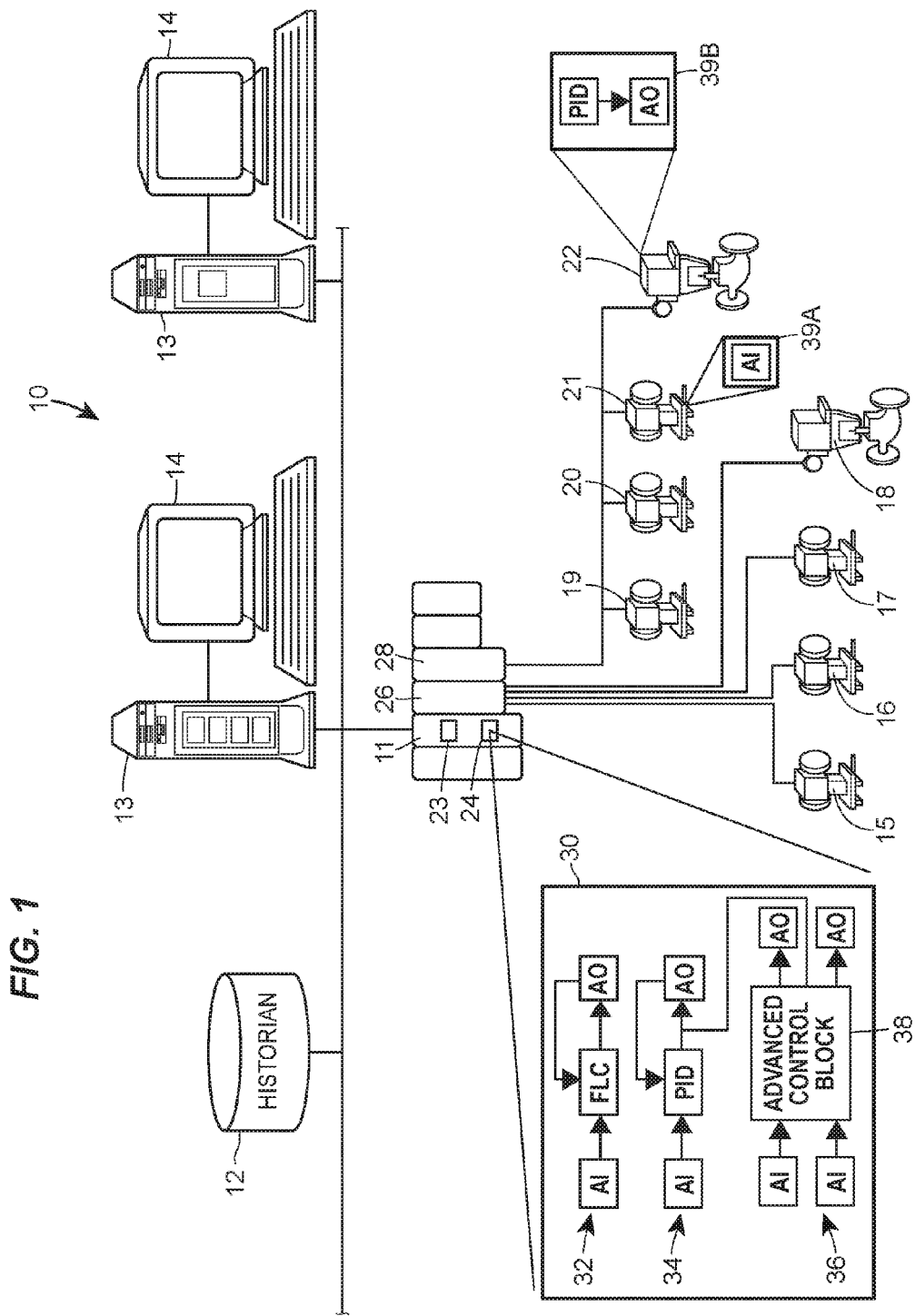
FIG. 1 is a block diagram illustrating an example of a distributed process control network located within a process plant including operator workstations that implement display routines and other applications associated with various functions within the process plant, as well as a workstation that provides system level graphical support that may be used to create and resize composite shapes and graphic displays for each of the various functional areas of the plant.

Now turning to FIG. 1, an exemplary process control system 10 includes a process controller 11 connected to a data historian 12 and to one or more host workstation terminals or computers 13 (which may be any type of computer, personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The controller 11 is, in FIG. 1, communicatively connected to the field devices 15-22 using a hardwired communication network and communication scheme.

Generally, the field devices 15-22 may be any types of devices, such as sensors, valves, transmitters, positioners, etc., while the I/O cards 26 and 28 may be any types of I/O devices conforming to any desired communication or controller protocol. The controller 11 includes a processor 23 that implements or oversees one or more process control routines (or any module, block, or sub-routine thereof) stored in a memory 24. Generally speaking, the controller 11 communicates with the field devices 15-22, the workstation terminals 13 and the data historian 12 to control a process in any desired manner. Moreover, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs a PID, an MPC, a fuzzy logic, etc., control technique, or an output function which controls the operation of some device, such as a valve, to perform some physical function within the process control system 10. Of course, hybrid and other types of function blocks exist and may be utilized herein. The function blocks may be stored in and executed by the controller 11 or other devices as described below.

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and/or may implement a process model based control routine, and thus may constitute or include a model predictive control (MPC) block, a neural network modeling or control block, a multi-variable fuzzy logic control block, a real-time-optimizer block, etc. It will be understood that the function blocks illustrated in FIG. 1, including the advanced control block 38, can be executed by the stand-alone controller 11 or, alternatively, can be located in and executed by any other processing device or control element of the process control system 10, such as one of the workstations 13 or one of the field devices 19-22. As an example, the field devices 21 and 22, which may be a transmitter and a valve, respectively, may execute control elements for implementing a control routine and, as such, include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID, an MPC or other control block in communication with an analog output (AO) block, as illustrated in FIG. 1.

Figure 2:
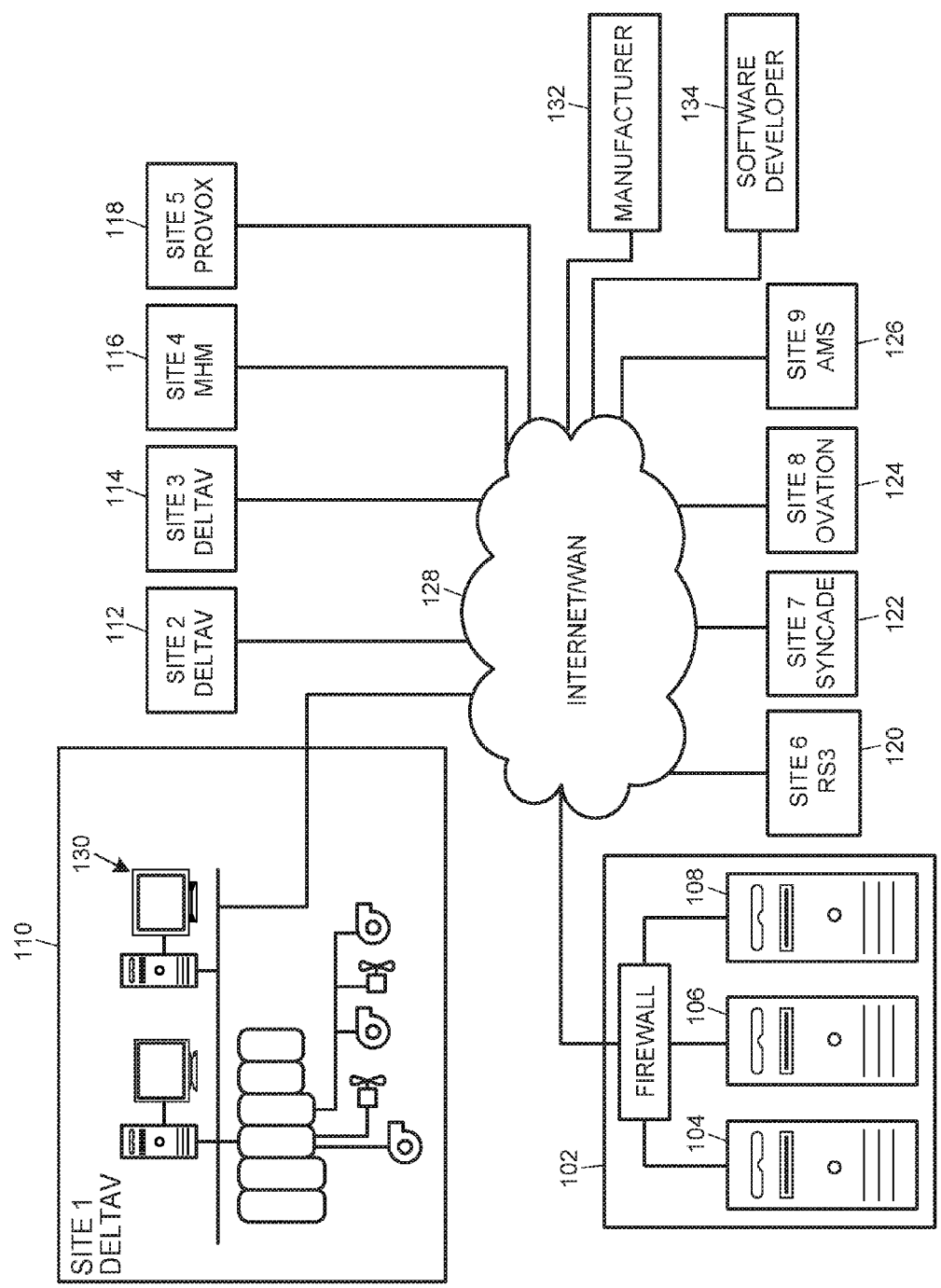
FIG. 2 is a block diagram illustrating an example remote maintenance system communicatively coupled to a plurality of process control systems.

In FIG. 2, an example remote maintenance system 102 includes a main server 104, a web page server 106, and a service management system ("SMS") server 108. In alternative example implementations, the example remote maintenance system 102 may include fewer or more servers than depicted in FIG. 1 to implement the example features, services, and capabilities of the example remote maintenance system 102 described herein.

In the illustrated example, the main server 104 is configured to receive registration and/or configuration information associated with process control systems (e.g., example process control system 130) monitored by the example remote maintenance system 102. The registration and/or configuration information may include field device information, software information, firmware information, operational status information, maintenance information, lifecycle information, etc. associated with hardware, software, and/or firmware used to implement the components and devices of monitored process control systems. The main server 104 may receive the registration and/or configuration information during an enrollment process of a process control system (e.g., when a process control system is brought online for the first time to be monitored by the example remote maintenance system 102). In addition, the main server 104 may receive new and/or updated registration and/or configuration information periodically and/or aperiodically after an enrollment process to ensure that the example remote maintenance system 102 has the latest and up-to-date information corresponding to monitored process control systems.

The main server 104 is also configured to monitor process control systems. For example, the main server 104 may be provided with software that, when executed, causes the main server 104 to monitor field devices and/or other components or devices of monitored process control systems based on, for example, the registration and/or configuration information received from the process control systems.

In the illustrated example, the web page server 106 is configured to create and serve web pages to system engineers, operators, and other process control personnel of monitored process control systems. In the illustrated example, the web page server 106 serves web pages including the graphical user interfaces (GUIs) described below in connection with FIGS. 8-15. The web pages may be used by process control personnel to provide information to and retrieve information from the example remote maintenance system 102. For example, the web pages served by the web page server 106 may be used to register a process control system with the example remote maintenance system 102 and to provide registration and/or configuration information to the main server 104.

In the illustrated example, the main server 104 and the web page server 106 are implemented separately to enable taking the web page server 106 offline without compromising the monitoring processes and registration/configuration information receiving processes performed by the main server 104. For example, the web page server 106 may be taken offline to perform maintenance (e.g., to add or upgrade web page interfaces, update security software, etc.) while the main server 104 continues to monitor process control systems.

In the illustrated example, the SMS server 108 is configured to store and process the registration/configuration information corresponding to each process control system monitored by the example remote maintenance system 102. For example, the SMS server 108 may include and/or be communicatively coupled to one or more data structures (e.g., databases) that store the registration/configuration information. The SMS server 108 may also be configured to store knowledge base articles (KBAs) (e.g., maintenance database entries or other database entries that include maintenance information or other information about process systems and/or parts thereof) that describe issues (e.g., software bugs, equipment failures, operating anomalies, etc.) associated with different components or devices of process control systems. Typically, the KBAs also include suggested workarounds, fixes, or other maintenance procedures associated with overcoming or remedying the indicated issues.

In the illustrated example, the SMS server 108 is configured to perform a risk factor matching process described below in connection with FIG. 3. A more detailed example of a KBA matching process is described in U.S. Pat. No. 7,698,242. In general, the risk factor matching process compares information stored in, or associated with, a risk factor (e.g., identification information, device type information, process control system type information or other criteria) to the registration/configuration information to determine which risk factors are applicable or relevant to which monitored process control systems.

The example remote maintenance system 102 is communicatively coupled to plant sites 110-126 via the Internet (or other wide area network (WAN)) 128. A WAN may be implemented using, for example, a telephone line, a digital subscriber line (DSL), an integrated services digital network (ISDN), a broadband cable system, a broadband alternating current (AC) system, a satellite communication system, fiber optic, etc.

Some or all of the sites 110-126 may be part of a single enterprise (e.g., operated by the same business entity, company, corporation, etc.) and may include manufacturing sites, distribution sites, refinery sites, paper mills, or any other type of industrial or business site having operations associated with process control systems. While the first site 110 is illustrated in relatively more detail than the other sites 112-126, one or all of the sites 112-126 may be implemented using configurations substantially similar or identical to (or different from) the illustrated configuration of the first site 110. In any case, the sites 110-126 include one or more process control systems that are monitored and maintained using the example remote maintenance system 102.

In the illustrated example, the first site 110 includes a process control system 130, such as a distributed process control system, though it should be understood that individual sites may have multiple process control systems. For example, one of the process control systems may be used to handle process fluids while the other may be used to operate a product manufacturing process. The process control system 130 may be used to perform substantially the same or different operations. Of course, the process control system 130 may be used to perform operations performed with any other type of process. Although the disclosure describes the remote maintenance system 102 in relation to the process control system 130, it should be understood that similar interactions occur between the remote maintenance system 102 and process control systems of other sites 112-126.

As further illustrated in the example, the process control systems of each site 110-126 may be part of one or more different product lines, such as the DeltaV™ control system sold by Emerson Process Management, the Ovation™ control system sold by Emerson Process Management, the Ovation™ Machinery Health Monitor (MHM) sold by Emerson Process Management, the PROVOX™ control system sold by Emerson Process Management, the RS3™ control system sold by Emerson Process Management, the Syncade™ production management platform sold by Emerson Process Management, the AMS Device Manager sold by Emerson Process Management. As discussed further herein, although each process control system may have a different and unique configuration, generally speaking it is intended that peer process control systems (e.g., just DeltaV™ systems, just Ovation™ systems, etc.) are used in scoring other process control systems that are members of the same product family of process control systems from a manufacturer, such as process control systems of the same or related product line.

The example remote maintenance system 102 may access the alarm and event information stored in the process control system 130, such as a server of the process control system connected to the network 128, and use the alarm and event information to determine whether maintenance may be required or whether any maintenance information (e.g., product documentation, bug reports, knowledgebase articles, product updates, etc.) may be available for any equipment in the process control system 130.

A user may use a workstation terminal at the process control system 130, such as the workstation terminals 13 of FIG. 1, to access information obtained from the controllers in the process control system, such as the controller 11 of FIG. 1, and/or the example remote maintenance system 102. In an example implementation, the workstation terminals may execute dedicated client-side software applications that establish network connections with the example remote maintenance system 102 to exchange maintenance information with the remote maintenance system 102. Alternatively or additionally, the workstation terminal may execute web browsers to access web pages or web-based applications to access the example remote maintenance system 102 and to perform substantially the same or similar operations as with a dedicated client-side software application. In any case, a user may use the dedicated client-side application or the web-based application to view, modify, and manage the maintenance information obtained from the controllers and the example remote maintenance system 102.

A user may perform maintenance related work via the workstation terminals. For example, the user may instruct the workstation terminals and/or the example remote maintenance system 102 to update or upgrade particular equipment (e.g., field devices, the controllers, etc.) with received software or firmware updates. Also, the user may view summary and detail information pertaining to open service calls associated with the process control systems. Other information the user may view, modify, and/or manage is described in greater detail below in connection with FIGS. 8-15. In some example implementations, the workstation terminals may also be configured to view, modify, and/or manage information associated with process control systems in the other sites 112-126.

The example remote maintenance system 102 may obtain maintenance information such as software/firmware updates, replacement device availability, manuals, technical documentation, bug reports, etc. from software vendors and device manufacturers. In the illustrated example, a device manufacturer system 132 and a software vendor system 134 are communicatively coupled to the network 128 to provide hardware and software/firmware update information to the example remote maintenance system 102. In this manner, the example remote maintenance system 102 can select update information pertaining to process control systems in each of the sites 110-126 and forward the selected information to the respective sites 110-126.

Figure 3:
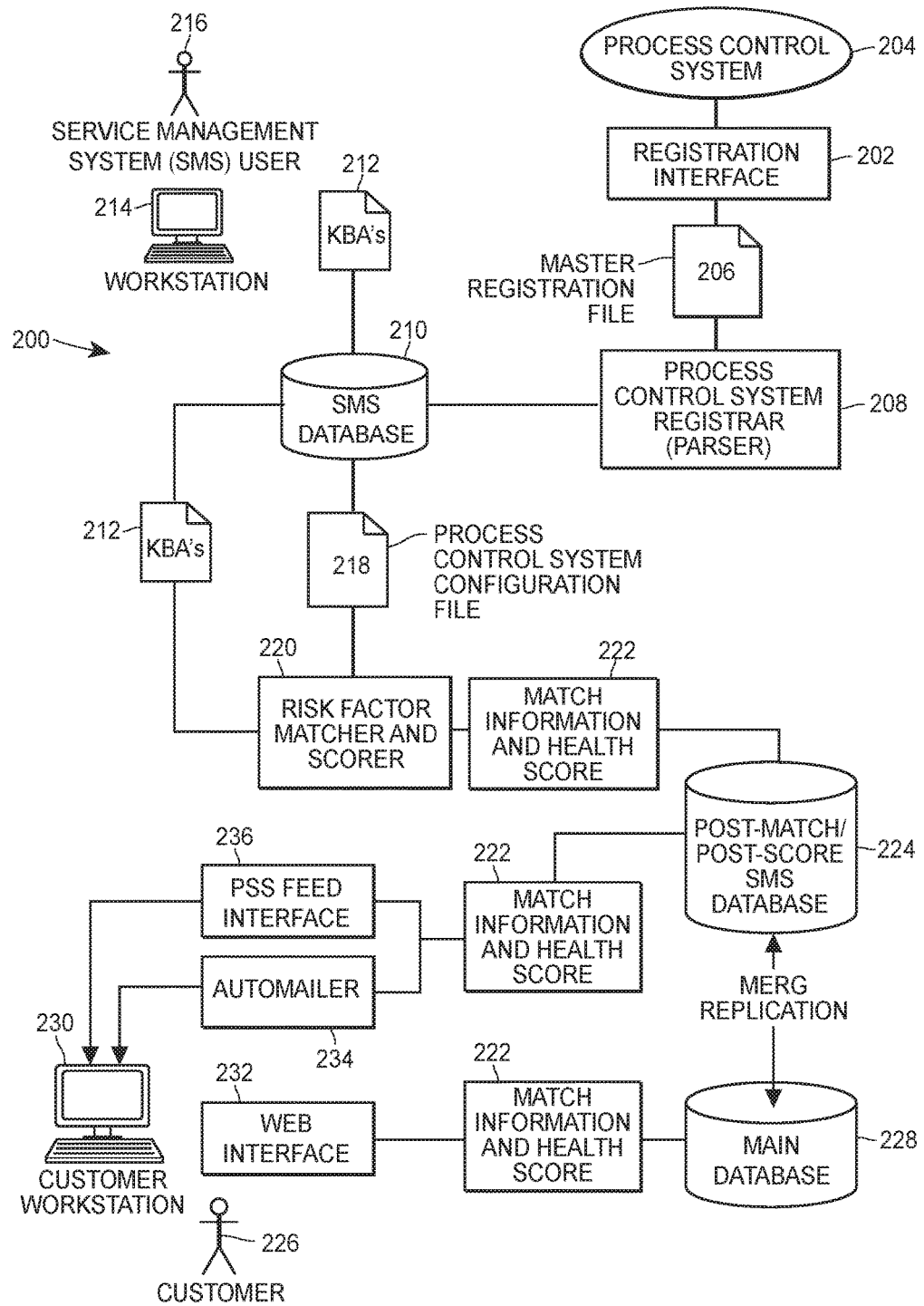
FIG. 3 is an example system that may be used to implement the example systems and methods described herein.

FIG. 3 is an example system 200 that may be used to implement the example systems and methods described herein. In some of the illustrated examples described below, components or parts of the example system 200 are described as being implemented using one or more parts of the example remote maintenance system 102 described above in connection with FIG. 2. However, the example system 200 may be implemented in combination with or separate from the example remote maintenance system 102. The example system 200 may be implemented using any desired combination of hardware, firmware, and/or software. In some example implementations, the example system 200 may be implemented as a single apparatus (e.g., a single apparatus, a device, etc.) or as two or more apparatus, some of which may be communicatively coupled to one another. For example, the one or more apparatus may be implemented using one or more integrated circuits, discrete semiconductor components, or passive electronic components. Additionally or alternatively, some or all of the blocks of the example system 200, or parts thereof, may be implemented using instructions, code, and/or other software and/or firmware, etc. stored on a machine accessible medium that, when executed by, for example, a processor system, perform the operations represented in the flow diagrams described below.

As shown in FIG. 3, the example system 200 includes a registration interface 202 that is communicatively coupled to an example process control system 204 (e.g., the process control systems 130 of the first site 110 of FIG. 2 and/or the process control systems (not shown) of the sites 112-126 of FIG. 2). The example process control system 204 is substantially similar or identical to the process control systems 130 of FIG. 2. In the illustrated example, the registration interface 202 may be implemented using the main server 104 of FIG. 2 and is configured to register the process control system 204 to use the example remote maintenance system 102 of FIG. 2. For example, the registration interface 202 may receive information (i.e., registration information) associated with the process control system 204. Registration information may pertain to hardware configurations, software, firmware, operating conditions, life cycle status, maintenance information, or any other information described above in connection with the graphical user interface displays of FIGS. 8-15. The registration information may include, for example, serial numbers, version numbers, model numbers, part numbers, network identifications, and/or any other information described above in connection with the graphical user interface displays of FIGS. 8-15. While the registration interface 202 may be resident in the example system 200, alternatively the registration interface 202 be situated in the process control system 204 (e.g., in the process control system 130 or made a site element 110-126) as security concerns about remote polling create a strong customer preference that the registration interface be resident at the customer site.

The registration interface 202 may collect registration information from the process control system 204 during an initial enrollment of the process control system 204 and/or after the initial enrollment any time the process control system 204 has any new or revised registration information (e.g., any time the process control system 204 is updated, upgraded, serviced, changed in operation, etc.) to communicate to the example system 200. In an example implementation, the registration interface 202 may automatically, periodically (e.g., daily, weekly, etc.) or aperiodically poll the process control system 204 to request any updated or new registration information. For example, the registration interface 202 may automatically communicate with a messenger server (e.g., the messenger server 136 of FIG. 1) associated with the process control system 204 to obtain new or updated registration and/or configuration information corresponding to the process control system 204.

Additionally or alternatively, the registration interface 202 may be manually controlled by an operator (e.g., a system engineer, a user, etc.) to poll the process control system 204. In any case, the process control system 204 (e.g., the messenger server 136 of FIG. 1) may automatically respond by communicating any new or updated registration information to the registration interface 202. In addition, an operator associated with the process control system 204 may use, for example, a workstation terminal (e.g., the workstation terminal 13 of FIG. 1) to manually cause new or updated registration information to be communicated from the process control system 204 to the registration interface 202 in response to requests for information from the registration interface 202 and/or any time the process control system 204 has new or updated registration information.

To enable communications between the process control system 204 and the example system 200, the process control system 204 may have client software (not shown) installed thereon (e.g., client software installed on a process control system server or a workstation terminal such as, for example, the workstation terminals 13 of FIG. 1) that enables the process control system 204 to receive requests for information from the registration interface 202 and to communicate registration information to the registration interface 202.

Although the example system 200 is shown communicatively coupled to one process control system (e.g., the process control system 204), the example system 200 may be communicatively coupled to any number of process control systems. For example, the example system 200 may be implemented using one or more servers (e.g., the main server 104, the web page server 106, the SMS server 108 of FIG. 2) communicatively coupled via the Internet to a plurality of process control systems (e.g., the process control systems of the first site 110 of FIG. 2 and/or the process control systems (not shown) of the sites 112-116 of FIG. 2). In such an example implementation, the registration interface 202 communicates with the process control systems and receives registration information from all of the process control systems.

The registration interface 202 generates a master registration file 206 corresponding to the process control system 204 based on the registration information received from the process control system 204. The master registration file 206 may store the registration information using an extensible markup language ("XML") format, a plain text format, or any other suitable format. The registration interface 202 generates and maintains a separate master registration file (e.g., the master registration file 206) for each process control system that the example system 200 monitors. In an example implementation, the registration interface 202 may be configured to encrypt the master registration file 206 to substantially reduce or eliminate data tampering by unauthorized persons or unauthorized network entities.

In an example implementation, the registration interface 202 also periodically analyzes the master registration file 206 for data corruption or tampering. If the registration interface 202 determines that registration information in the master registration file 206 is corrupted or has been compromised (e.g., tampered with), the registration interface 202 may store a descriptor associated with the corrupted or compromised data in the master registration file 206 indicating a data error and the type of error. The descriptor may include a sender identity (e.g., a user name of an operator associated with the process control system 204), a source identity (e.g., a process control system identification of the process control system 204), and a date associated with reception of the corrupted or compromised data.

To parse (e.g., filter, separate, categorize, organize, etc.) the registration information stored in the master registration file 206, the example system 200 is provided with a process control system registrar 208. In the illustrated example, the process control system registrar 208 may be implemented using the main server 104 of FIG. 2 and is configured to read the registration information in the master registration file 206, parses the registration information, and organizes the information into separate categories. When the registration interface 202 receives new or updated registration information and/or detects corrupted or compromised data in the master registration file 206, the registration interface 202 creates a change record event to indicate new or updated registration information has been received for the master registration file 206 and communicates the change record event to the process control system registrar 208.

In the illustrated example, the process control system registrar 208 reads the registration information from the master registration file 206 and organizes the registration information into hardware categories, software categories, firmware categories, operating conditions categories, life cycle categories, maintenance categories, or any other categories associated with the information described above in connection with the graphical user interface displays of FIGS. 8-15. For each category the process control system registrar 208 may further categorize the registration information into subcategories. Example subcategories for a hardware category may include device type, model number, manufacturer part number, etc.

To store the parsed registration information, the example system 200 is provided with a service management system ("SMS") database 210 communicatively coupled to the process control system registrar 208. The SMS database 210 may be implemented in and/or communicatively coupled to, for example, the SMS server 108 (FIG. 2) and is configured to store SMS data records (not shown) that include the categorized information organized by the process control system registrar 208. The SMS database 210 stores data records corresponding to each process control system that is monitored by the example system 200. In the illustrated example, after the process control system registrar 208 categorizes the registration information obtained from the master registration file 206, the process control system registrar 208 communicates the categorized registration information to the SMS database 210 to update the SMS data records associated with the process control system 204.

The registration information stored in the SMS database 210 may be used to associate components (e.g., devices, hardware, software, etc.) of the process control system 204 with risk factors 212 (e.g., KBAs, software updates, action alerts, service calls, lifecycle status). An example risk factor matching process can use the SMS data records stored in the SMS database 210 to find ones of the risk factors 212 relevant to monitored process control systems and/or portions thereof.

In the illustrated example, the risk factors 212 are provided by a workstation 214 and stored in the SMS database 210. The workstation 214 may be associated with a business entity providing the example system 200 and operators associated with the example system 200 (e.g., an SMS user 216) may provide information to the workstation 214 to at least some of the risk factors 212. Additionally or alternatively, the workstation 214 and or other workstations communicatively coupled to the example system 200 that provide some of the risk factors 212 may be associated with device manufacturers (e.g., the device manufacturer 138 of FIG. 1) and/or software developers (e.g., the software developer 140 of FIG. 1) that design and/or manufacture components in the process control system 204. Of course, risk factors may also be communicated to the workstation 214 from any other source.

To enable the example system 200 to match components of the process control system 204 to relevant ones of the risk factors 212, the example system 200 generates a process control system configuration file 218 based on the registration information stored in the SMS database 210. For example, the SMS server 108 of FIG. 2 may retrieve information from the SMS database 210 and generate the process control system configuration file 218 using the retrieved information. Although only one process control system configuration file (e.g., the process control system configuration file 218) is shown, the example system 200 may provide a plurality of process control system configuration files, each corresponding to a different process control system (e.g., the process control system 204, the process control system 130 of the first site 110 of FIG. 2, the process control systems (not shown) of the sites 112-126 of FIG. 2, etc.) monitored by the example system 200.

To match components of the process control system 204 to relevant ones of the risk factors 212, the example system 200 is provided with an example risk factor matcher and scorer 220. The example risk factor matcher and scorer 220 receives the risk factors 212 and the process control system configuration file 218. The risk factor matcher and scorer 220 compares information (e.g., serial numbers, version numbers, model numbers, part numbers, network identifications, and/or any other information described above in connection with the graphical user interface displays of FIGS. 8-15) stored in the process control system configuration file 218 with information in the risk factors 212 to determine which of the risk factors 212 are applicable or relevant to components in the process control system 204. In the illustrated example, the risk factor matcher and scorer 220 is implemented according to the example risk factor matching process described below in connection with flow diagrams depicted in FIG. 5.

The example risk factor matcher and scorer 220 provides match information and health score 222 including the ones of the risk factors 212 relevant to the process control system 204 and at least some of the configuration information from the process control system configuration file 218 to which the relevant ones of the risk factors 212 pertain. The risk factor matcher and scorer 220 may provide the match information and health score 222 in an XML file, a plain text file, a spreadsheet file (e.g., an .XLS file), or any other suitable file. In the illustrated example, the configuration information provided in the match information and health score 222 may include, for example, device types, model descriptions, serial numbers, software revision numbers, hardware revision numbers, and/or any other information that may be of interest to an operator associated with the process control system 204.

To store the match information and health score 222, the example system 200 is provided with a post-match/post-score SMS database 224. The post-match/post-score SMS database 224 may be implemented in and/or communicatively coupled to, for example, the SMS server 108 of FIG. 2.

To enable an operator associated with the process control system 204 (e.g., a customer user 226) to retrieve the match information and health score 222, the information in the post-match/post-score SMS database 224 is replicated in a main database 228 so that the match information and health score 222 is stored in the post-matched/post-scored SMS database 224 and the main database 228. In the illustrated example, the main database 228 may be implemented in and/or communicatively coupled to the main server 104 of FIG. 2.

As shown in FIG. 3, the customer user 226 may access and/or retrieve the match information and health score 222 via a customer workstation 230 using several interfaces. In the illustrated example, the example system 200 is provided with a web interface 232 that the customer user 226 may use to retrieve the match information and health score 222. For example, the web interface 232 may generate and serve web pages substantially similar or identical some of the example screens described below in connection with FIGS. 8-15. Additionally or alternatively, the web interface 232 may enable the customer user 226 to download a file (e.g., an XLS file, an XML file, etc.) including the match information and health score 222. The web interface 232 may be implemented using the web page server 106 of FIG. 2.

To deliver the match information and health score 222 to the customer user 226 via e-mail, short message service, multimedia messaging service, etc., the example system 200 is provided with an automailer 234. For example, the automailer 234 may e-mail an XML file as an attachment to an e-mail account of the customer user 226. Alternatively, the automailer 234 may e-mail an embedded screen interface substantially similar or identical to the screens described below in connection with FIGS. 8-15. The customer user 226 may then access the match information and health score 222 via the workstation 230 or any other e-mail access device. In some example implementations, the automailer 234 may encrypt the match information and health score 222 prior to transmitting via an e-mail and/or may encrypt the e-mail used to send the match information and health score 222. The automailer 234 may be implemented using an automailer application executed by the main server 104 and/or the SMS server 108 of FIG. 2.

To deliver the match information and health score 222 to the customer user 226 via a really simple syndication feed ("RSS feed"), the example system 200 is provided with an RSS feed interface 236. In the illustrated example, the RSS feed interface 236 formats the match information and health score 222 into RSS format and transmits the RSS formatted match information to an RSS receiver of the customer user 226. An RSS receiver may display RSS feed information via any one or more of the graphical user interface screens described above in connection with FIGS. 8-15. For example, an RSS viewing area may be implemented in a navigation pane and/or title pane of the GUI interface screens. In some example implementations, the RSS feed interface 236 may send via an RSS feed only a notification that new match information is available for retrieval. The customer user 226 may then respond by accessing the match information and health score 222 via the web interface 232.

Figure 4:
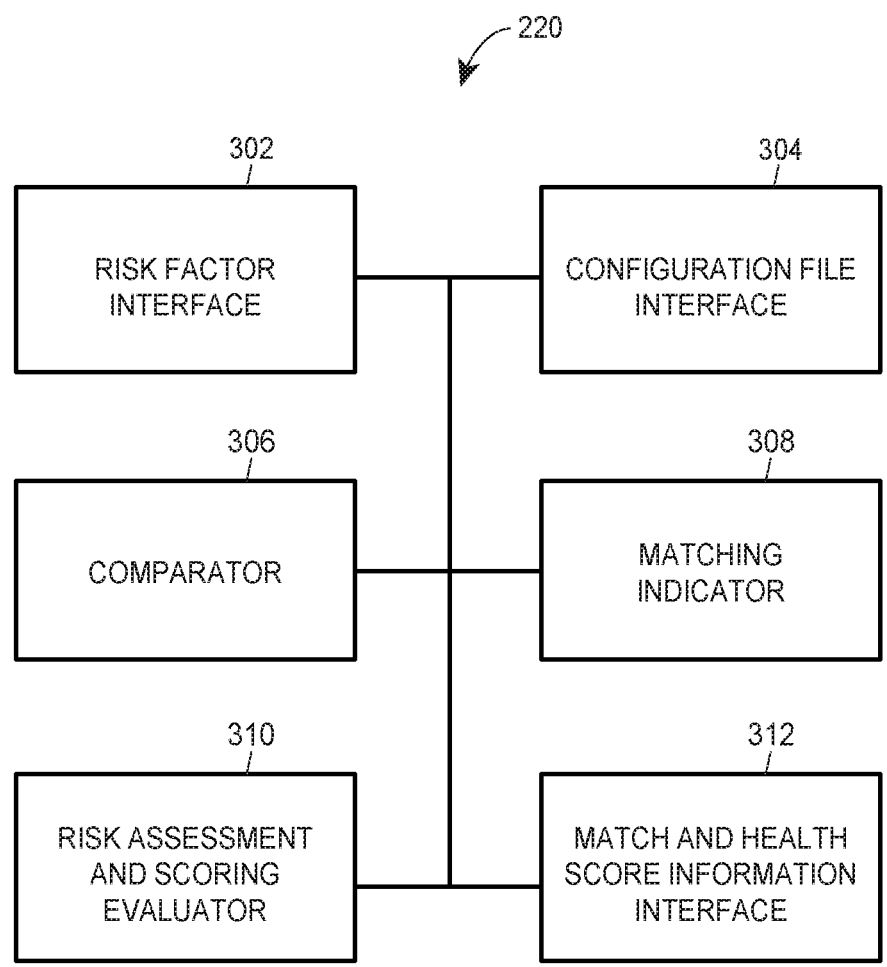
FIG. 4 is a detailed block diagram of an example risk factor system matcher of the example system of FIG. 3.

FIG. 4 is a detailed block diagram of the example risk factor matcher and scorer 220 of the example system 200 of FIG. 3. The example structures shown in FIG. 4 may be implemented using any desired combination of hardware and/or software. For example, one or more integrated circuits, discrete semiconductor components, or passive electronic components may be used. Additionally or alternatively, some or all, or parts thereof, of the example structures of FIG. 4 may be implemented using instructions, code, or other software and/or firmware, etc. stored on a computer-readable medium that, when executed by, for example, a processor system, perform the methods described herein. Further, the example method described below in connection with FIG. 5 describe example operations or processes that may be used to implement some or all of the functions or operations associated with the structures shown in FIG. 4.

The example risk factor matcher and scorer 220 is provided with a risk factor interface 302 to obtain the risk factors 212 from the SMS database 210 (FIG. 3) and to retrieve information from the risk factors 212. For example, the risk factor interface 302 may retrieve risk factor criteria or risk factor attributes including equipment serial numbers, part numbers, software version numbers, software license information, device descriptions, hardware version numbers, device redundancy information (e.g., whether a primary device is associated with a redundant device to assume primary device responsibilities in case of primary device failure), device driver information, software service pack information, device shipment date information, etc. The risk factor criteria may be any criteria, attribute, or information that may be used to match a risk factor with a process control system and/or components within a process control system. Example risk factor criteria includes process control system types to which ones of the risk factors 212 apply, process control system identifiers, model descriptions of components, serial numbers of components, and the software and hardware revision numbers associated with the components. Of course, other criteria corresponding to risk factors and process control systems and/or components of process control systems may be used.

To retrieve and access the process control system configuration file 218 of FIG. 3, the risk factor matcher and scorer 220 is provided with a configuration file interface 304. In the illustrated example, the configuration file interface 304 is configured to communicate with the SMS database 210 (FIG. 3) to retrieve process control system configuration files (e.g., the process control system configuration file 218 of FIG. 3) of process control systems. For example, the configuration file interface 304 may communicate process control system identification information to the SMS database 210 and the SMS database 210 may respond by communicating a process control system configuration file to the configuration file interface 304 of the identified process control system. In the illustrated example, the configuration file interface 304 is also configured to retrieve information (e.g., field device criteria or attributes) from process control system configuration files (e.g., the process control system configuration file 218).

To compare risk factor criteria retrieved from the risk factors 212 with process control system criteria or attributes retrieved from the process control system configuration file 218, the risk factor matcher and scorer 220 is provided with a comparator 306. In addition, the comparator 306 is configured to compare risk factor criteria and/or process control system criteria with other values such as, for example, null values or any other values.

To generate information indicative of whether the comparator 306 has found a match, the risk factor matcher and scorer 220 is provided with a matching indicator 308. In the illustrated example, when the comparator 306 finds a match between a risk factor criterion value and a process control system criterion value or between any other values (e.g., a risk factor criterion value and a null value), the comparator 306 communicates a signal or information to the matching indicator 308 indicating the match was found. The matching indicator 308 then generates information indicating the match. For example, the matching indicator 308 may store the matching information in the match information and health score 222 (FIG. 3). In an example implementation, the matching information may include a risk factor identification value and an identification value of a matching field device, workstation, etc. or a process control system. Additionally or alternatively, the matching information may include a risk factor criterion value and a matching process control system criterion value. In another example implementation, the match information and health score 222 may include a listing of field devices, workstations, etc. of a process control system and the matching indicator 308 may store a flag or bit value corresponding to particular field devices, workstations, etc. of the process control system that match one or more risk factor criteria.

To generate a health score for a process control system that negates the effects of the continuous introduction of risk factors and scores the health of a process control system relative to the health of other process control systems, the risk factor matcher and scorer 220 is provided with a risk assessment and scoring evaluator 310. In the illustrated example, when the comparator 306 has matched all risk factors for a process control system within given period (e.g., daily), and ideally matched all risk factors in a given period for all process control systems or at least all peer process control systems, and the matching indicator 308 generates information indicating the match of all known risk factor for the process control system(s), the risk assessment and scoring evaluator 310 uses the risk factors for a process control system, and updates the process control system's previous risk assessment based on the elimination or introduction of risk factors to the process control system. In particular, the risk assessment and scoring evaluator 310 may utilize weight values associated with each risk factor in calculating the risk assessment for the process control system. Thereafter, the risk assessment and scoring evaluator 310 may use the risk assessments of all process control systems, or at least peer process control systems, to calibrate a health score scale to the average risk assessment among the (peer) process control systems, and scale the risk assessment for a particular process control system to the health score scale using a nonlinear scale, and, more particularly, a nonlinear scaling factor, so as to promote more movement among health scores towards the center of the health score scale than towards the end of the scale, from one period to the next (e.g., from one day to the next). To communicate the match information and health score 222 to the post-match/post-score SMS database 224 (FIG. 3), the risk factor matcher and scorer 220 is provided with a match information and health score interface 312.

Figure 5:
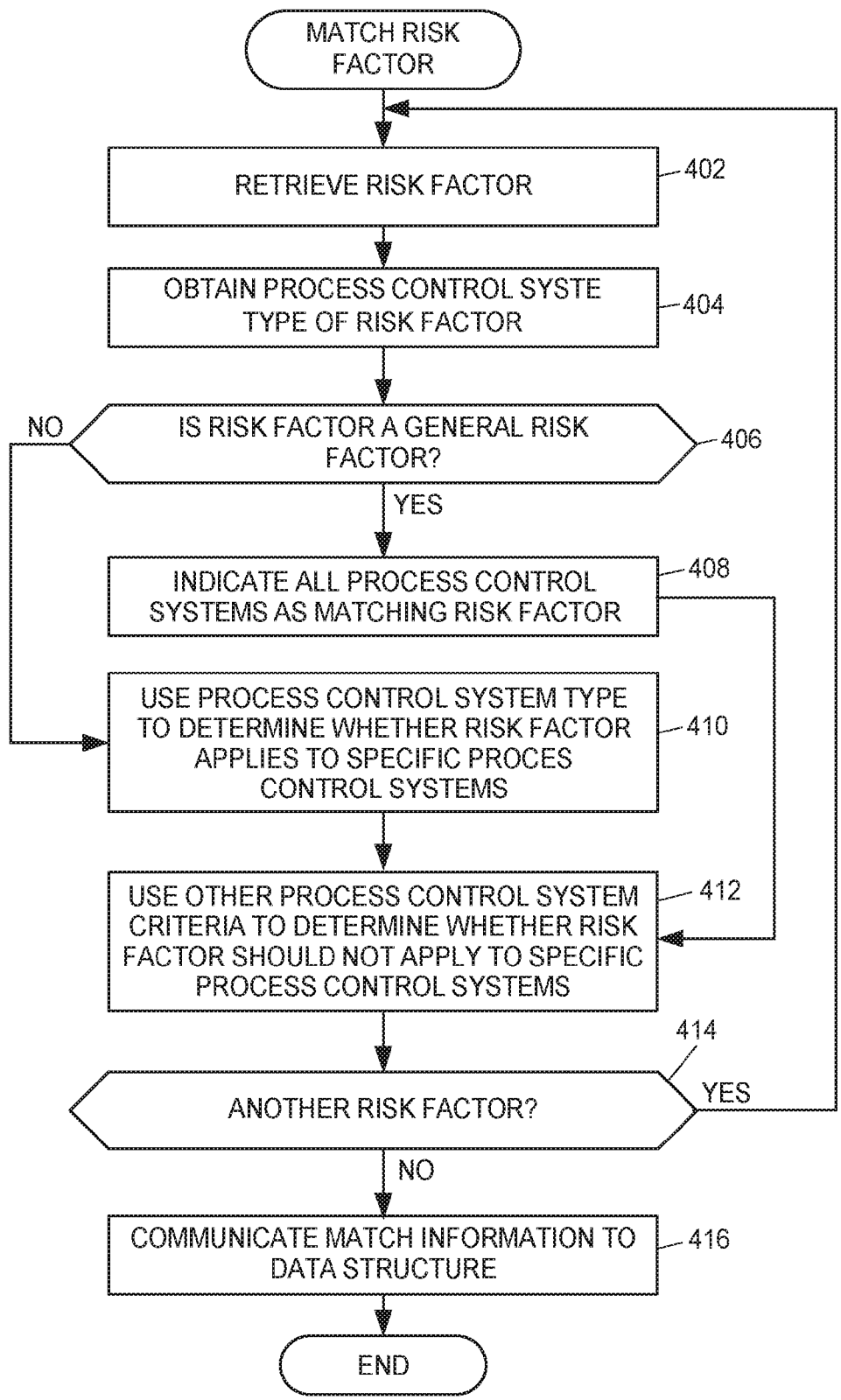
FIG. 5 depicts a flow diagram of an example method that may be used to match risk factors to process control systems.

FIG. 5 depicts a flow diagram of an example method that may be used to match risk factors (e.g., KBAs, software updates, action alerts, service calls, lifecycle status, etc.) to process control systems (e.g., process control systems of sites 110-126, or peer process control systems of the 110-114), or particular process control systems (e.g., process control system of site 110). The example method is configured to ensure with a relatively high degree of certainty that each risk factor will be matched with substantially all monitored process control systems or particular ones thereof to which that risk factor is applicable. In the illustrated example, the example method of matching risk factors is used to compare risk factors with monitored process control systems at a global level (e.g., all process control systems, all peer process control systems, etc.) and at a process control system level. In this manner, general risk factors are matched with all or substantially all monitored process control systems (or all or substantially all peer process control systems) to inform operators, system engineers, etc. of the applicable risk factors. The example method of matching risk factors is used to compare risk factors with particular process control systems to ensure that each risk factor is matched with specific monitored process control systems having the same process control type as that risk factor. The example method of matching risk factors further ensures matching monitored process control systems with relevant risk factors even if the process control types and the risk factors do not have the same process control types. Specifically, the example method of matching risk factors compares process control system criteria and risk factor criteria. For example, if a firmware update is applicable to process control systems not having the same process control system type as described in a process control system type field of the firmware update, the example method of matching risk factors may be used to match the firmware update to the applicable process control systems based on comparisons of firmware update criteria and process control system criteria. In this manner, process control systems not having the same process control type as a firmware update but having software, firmware, hardware, etc. that is the subject of the firmware update can be matched to the firmware update.

Initially, the risk factor interface 302 (FIG. 4) retrieves one of the risk factors 212 of FIG. 3 (block 402) from, for example, the SMS database 210 (FIG. 3). The risk factor interface 302 then obtains the process control system type of the retrieved risk factor (block 404). In the illustrated example, risk factors can be general risk factors that are related to process control systems (or peer process control systems) generally or risk factors can be specific risk factors that are related to a particular process control system or specific components (e.g., field devices, workstations, controllers, etc.) of a particular process control system. In addition, the risk factors may include an action, such as a required action category and an advisement category, where a risk factor having a required action category indicates that action must be taken at the process control system, whereas a risk factor having an advisement category does not necessarily require action at the process control system, but nonetheless indicates information associated with improving process control system performance. A risk factor having a required action category will generally affect a process control system's health score from period to period and may be weighted greater than risk factors having an advisement category. Risk factors having an advisement category may have no effect on a process control system's health score whatsoever (e.g., no weighting factor for risk factors having an advisement category), may have a positive, but little or no negative effect (e.g., provide a risk factor with an advisement category that has been addressed with a weighting factor, but a risk factor with an advisement category that has not been addressed is not weighted or lightly weighted), or may have an equally positive and negative effect (e.g., apply weights to risk factors having an advisement category).

The risk factor interface 302 then determines whether the retrieved risk factor is a general risk factor (block 406). If the risk factor interface 302 determines that the retrieved risk factor is a general risk factor (block 406), the matching indicator 308 (FIG. 4) stores information in the match information and health score 222 (FIG. 3) to indicate that the retrieved risk factor applies to all monitored process control systems (block 408) having information in the SMS database 210 (e.g., all process control systems or all peer process control systems monitored by the example system 200). However, if the risk factor interface 302 determines that the retrieved risk factor is not a general risk factor (block 406), the risk factor matcher and scorer 220 then uses a process control system type of the retrieved risk factor and process control system types of monitored process control systems (e.g., process control systems having configuration information stored in the SMS database 210) to determine whether the risk factor applies to specific monitored process control systems (block 410).

In particular, the risk factor matcher and scorer 220 selects a monitored process control system (e.g. one of a plurality of monitored process control systems having configuration information stored in the SMS database 210 of FIG. 3). In the illustrated example, the risk factor matcher and scorer 220 selects the process control system 204 (FIG. 3). The configuration file interface 304 then retrieves the process control system configuration file (e.g., the process control system configuration file 218 of FIG. 3) corresponding to the process control system 204. For example, the configuration file interface 304 retrieves the process control system configuration file 218 from the SMS database 210 by sending a request to the SMS database 210 including identification information identifying the process control system 204. The configuration file interface 304 then retrieves a process control system type. The configuration file interface 304 may access the process control system configuration file 218 to retrieve the process control system type of each process control system. In the illustrated example, the configuration file interface 304 retrieves one process control system type at a time from the process control system configuration file 218 at block. The comparator 306 then compares the retrieved process control system type of the process control system 204 to the risk factor process control system type retrieved at block 404 of FIG. 5 to determine whether the retrieved process control system type of the process control system 204 matches the risk factor process control system type. If the comparator 306 determines that the process control system type of the process control system 204 matches the risk factor process control system type, the matching indicator 308 (FIG. 4) stores information in the match information and health score 222 (FIG. 3) to indicate the match between the process control system of the process control system 204 and the risk factor. After the matching indicator 308 indicates the match or if the comparator 306 determines that the process control system type of the process control system 204 does not match the risk factor process control system type, the risk factor matcher and scorer 220 determines whether the process control system 204 has another process control system to compare with the risk factor process control system type. If the risk factor matcher and scorer 220 determines that the process control system 204 has another process control system to be compared, the configuration file interface 304 retrieves the process control system type of the next process control system of the process control system 204 to be compared to the risk factor process control system type retrieved at block 404 of FIG. 5. Otherwise, if the risk factor matcher and scorer 220 determines that the process control system 204 does not have another process control system to be compared, the risk factor matcher and scorer 220 determines whether there is another monitored process control system to be analyzed. For example, the configuration file interface 304 may query the SMS database 210 to determine whether the SMS database 210 has configuration information for any other monitored process control systems that the risk factor matcher and scorer 220 has not yet compared based on process control system types with the risk factor. If the risk factor matcher and scorer 220 determines that there is another monitored process control system to be analyzed, control returns to block and the risk factor matcher and scorer 220 selects another monitored process control system.

After comparing node types (block 410) or after the matching indicator 308 stores information indicating that the retrieved risk factor applies to all monitored process control systems or peer monitored process control systems (block 408), the risk factor matcher and scorer 220 uses other process control system criteria of the retrieved risk factor and the monitored process control systems to determine whether the risk factor should not apply to any specific nodes of the monitored process control systems (block 412). For example, if the operation(s) of block 410 determine that a risk factor applies to a particular process control system, the risk factor status is indicated as matched for that process control system unless the operation(s) of block 412 determines that other process control system criteria associated with that process control system exist to rule out the applicability of the risk factor to the process control system.

The risk factor matcher and scorer 220 then determines whether there is another risk factor to be analyzed (block 414). If there is another risk factor in, for example, the SMS database 210 to be analyzed, control returns to block 402 and the risk factor interface 302 retrieves the next risk factor from the SMS database 210. Otherwise, the match information and health score interface 312 communicates the match information and health score 222 to a data structure (block 416) such as, for example, the post-match/post-score SMS database 224 (FIG. 3) and the process is ended.

Figure 6:
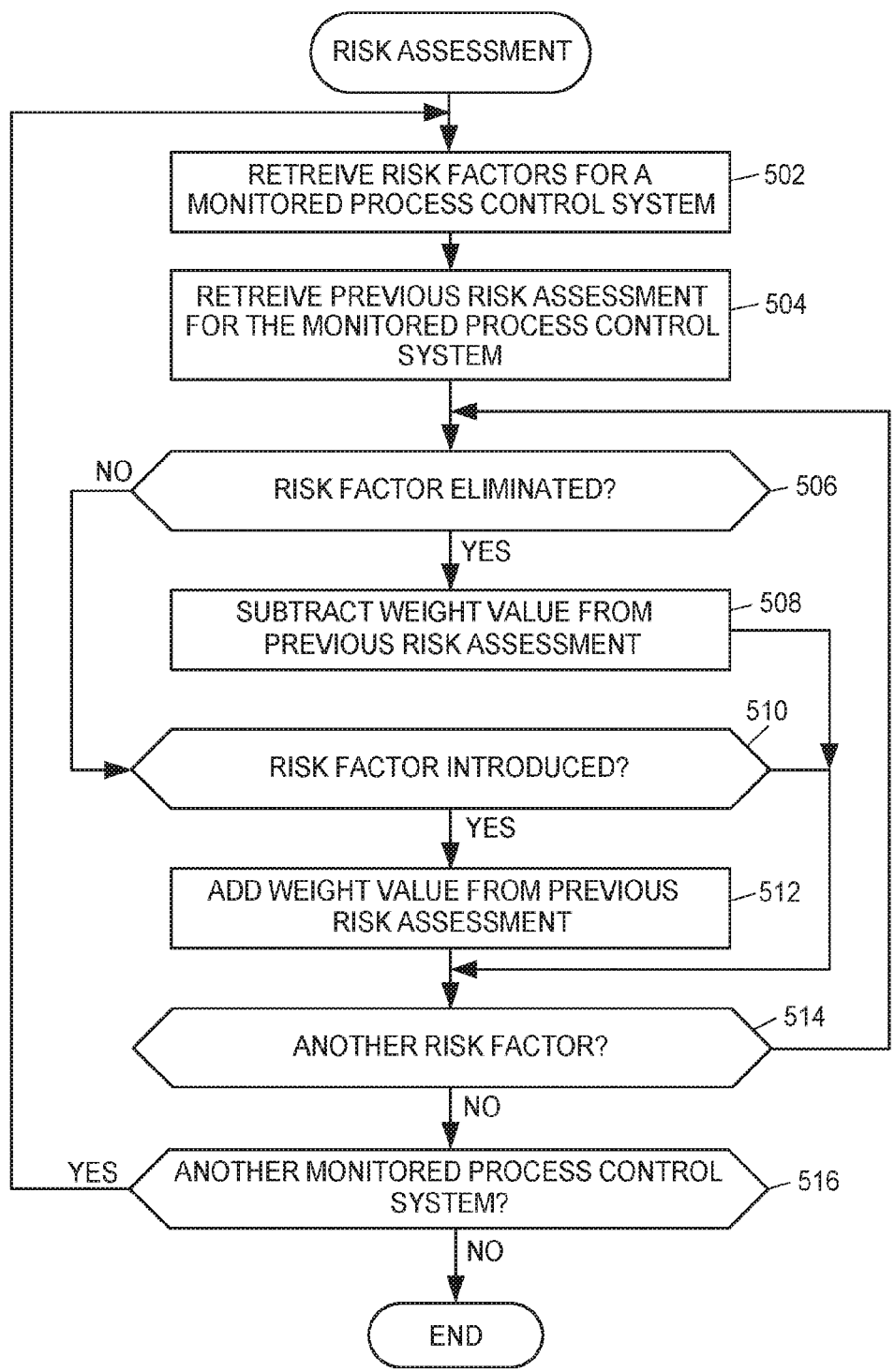
FIG. 6 is a flowchart illustrating an example method that may be used to periodically determine a risk assessment for each process control system.

FIG. 6 depicts a flow diagram of an example method that may be used to determine a risk assessment for each process control system (e.g., process control systems of sites 110-126, or peer process control systems of sites 110-114). The example method is configured to be executed periodically, such as daily, bi-daily, weekly, etc. Generally speaking, the disclosed method for negating the effects of continuous introduction of risk factors and scoring the health of process control systems based on its peers operates to a more accurate degree when the example method to determine a risk assessment for each process control system is performed relatively frequently (e.g., daily) than infrequently (e.g., monthly), simply because the amount of risk factors that may accumulate for any or all of the process control systems over a longer period of time tends to negatively skew a process control system's health score.

Further, the example method is configured to weight risk factors according to the type of risk factor (e.g., based on the risk factor criterion information). For example, KBAs and software updates may be weighted differently (i.e., have a different weighting factor) from action alerts and service calls, whereas service calls may be weighted differently from software updates. Similarly, lifecycle status may be weighted differently from other risk factors, including those above.

In addition, only certain risk factor types (e.g., based on the risk factor criterion information) may be counted in the example method, where counted risk factors are categorized as requiring action (actionable risk factors), and uncounted risk factors are categorized as not requiring action. For example, KBAs and software updates that are marked "For-Review" (e.g., as provided by the risk factor criterion information) may each be counted once towards a process control system's risk assessment, whereas KBAs and software updates marked "As-Needed" or "Information" may not be counted. Likewise, KBAs marked as "In-Progress" or "Not Applicable" may not be counted towards the risk assessment based on a presumption that a customer user 226 is aware of and mitigating (or otherwise addressing or determining the relevance of) the risk. KBAs may each count once per process control system component affected by the KBA issue (e.g., each device affected) or independent of the number of system components affected (e.g., once per process control system). Software updates may also each count once per workstation or controller needing a software or firmware update, or independent of the number of workstations and controllers needing the update (e.g., once per process control system). Only open action alerts and open service calls may count towards the risk assessment, with each open action alert and open service call counting once per process control system. Action alerts may be created (opened) when a monitored health parameter indicates a health condition that could lead to a process disruption or loss of asset availability, where the remote maintenance system 102 continually monitors important health information of process control system components, such as controllers, servers, workstations, Safety Instrumented System (SIS) controllers, switches, firewalls, infrastructure, etc. Only obsolete and unsupported hardware or software may count as a risk factor (e.g., the hardware manufacturer or software developer no longer makes and sells the product, and no longer supports the product with updates, hotfixes, troubleshooting, etc.).

Still further, different risk factor types may, in turn, be weighted according to category. For example, a KBA may be weighted according to the categorization of the KBA, where a KBA categorized as a potential safety issue for a process control system (i.e., a safety KBA) is weighted differently from a KBA categorized as a process disruption for the process control system (i.e., a process KBA), both of which are weighted differently from a KBA categorized as a security issue for the process control system (i.e., a security KBA). Similarly, a software update may be weighted according to the categorization of the software update, where a software update categorized as a potential safety issue for a process control system (i.e., a safety software update) is weighted differently from a software update categorized as a process disruption for the process control system (i.e., a process software update), both of which are weighted differently from a software update categorized as a security issue for the process control system (i.e., a security software update). A service call may also be categorized and weighted according to operational impact, where one type of service call is categorized as a non-functional operation of the process control system, such as the process being down, a Safety Instrumented System (SIS) issue, or the process being unavailable or at substantial risk. Another service call is categorized as a functional, albeit impaired or jeopardized, operation of the process control system, such as the process being up but yield, rate, quality or regulatory compliance are impaired or jeopardized. A lifecycle status may be categorized and weighted as current or active (e.g., the hardware or software continues to be manufactured and supported (e.g., with updates, troubleshooting, etc.)), or categorized as retired (e.g., the hardware or software has been discontinued by the hardware manufacturer or software developer, and is no long supported). Retired lifecycles may be weighted higher than current/active lifecycles, and, in some cases, current/active lifecycles may not be weighted at all (i.e., only retired lifecycles count).

It should also be understood that each type of process control system (e.g., DeltaV™, Ovation™, AMS™, etc.) may have different risk factors, and each risk factor, in turn, has different weighting values. As such, while each process control system of sites 110-126 is associated with a risk assessment based on its risk factors as calculated from the example method of FIG. 6, for the purposes of scoring the health of each process control system of sites 110-126 as with the example method of FIG. 7, only peer process control systems (e.g., just DeltaV™ process control systems) may be considered.

Referring to FIG. 6, initially the example method may retrieve the risk factors matched to the process control system from the example method of FIG. 5. In particular, the risk assessment and scoring evaluator 310 (FIG. 4) retrieves the risk factors 212 matched to the process control system (block 502) from, for example, the post-match/post-score SMS database 224 and specifically the match information therein (FIG. 3). The risk assessment and scoring evaluator 310 then obtains the previous risk assessment for the monitored process control system from the match and health score interface 312 (block 504). If this is the first time the process control system is having its risk assessment and health score evaluated, obtaining the previous risk assessment may be omitted or otherwise bypassed. Alternatively, the previous risk assessment may be defaulted to a baseline value (e.g., zero, or the previous average of all risk assessments for all process control systems). Further, the retrieval of the previous risk assessment may be omitted for all iterations (i.e., for each periodic determination), regardless of whether a risk assessment for the process control system was previously determined, in which case each process control system may start with a baseline risk assessment (e.g., zero or the previous average of all risk assessments for all process control systems).

The risk assessment and scoring evaluator 310 then determines whether the retrieved risk factor has been eliminated (block 506). For example, as a customer user 226 (e.g., a system engineer) is notified of risk factors matched to the process control system, the customer user 226 may address the risk factor or ignore the risk factor. If the customer user 226 addresses the risk factor, the risk factor is considered eliminated. Risk factors may be considered eliminated in a number of ways. For example, using the web interface 232, a customer user 226 for a process control system may indicate that an actionable KBA has been read (e.g., "In Progress," "Not Applicable" or "Completed"), an actionable software update is installed (e.g., "In Progress," "Not Applicable" or "Completed"), an open action alert is addressed (e.g., "Closed" or "Downgraded"), an open service call is addressed (e.g., "Closed" or "Downgraded"), and/or a retired lifecycle is upgraded (e.g., "Current/Active"), such as when obsolete hardware or software is replaced. The web interface 232 may communicate these indications to the post-match/post-score SMS database 224 for use by the risk assessment and scoring evaluator 310. If the risk factor is considered eliminated, its weight value is subtracted from the risk assessment for the process control system, or, in the case of modifying a previous risk assessment, subtracted from the previous risk assessment (block 508). If there is another risk factor to consider for the process control system (block 514), the example method reverts control back to block 506 for consideration of the next risk factor. Else, the example method determined whether there is another monitored process control system for which to assess a risk assessment (block 516). If so, control reverts to block 502 to retrieve the risk factors for the next monitored process control system. Else, the example method ends for that period, to be executed automatically by the risk assessment and scoring evaluator 310 the next period (e.g., daily).

The risk assessment and scoring evaluator 310 then determines whether the retrieved risk factor has been introduced, such as a new risk factor introduced to the process control system since the last time the example method was executed for the process control system (block 510). Risk factors may be introduced in a number of ways. For example, an actionable KBA that is unread, an actionable software update that is available but not installed, an opened action alert that is unaddressed, an opened service call that is unaddressed and/or retired hardware/software. In many cases, the newly introduced risk factors remain actionable because the customer user 226, such as the system engineer, has not had opportunity to even be notified of the risk factor. Thus, system health management, (i.e., the systematic elimination of risks to system reliability, security and performance) is an ongoing process. For example, each month new security updates are issued by Microsoft® and tested for compatibility with various process control system product lines. Similarly, each month, service calls received from process control systems of sites 110-126 are evaluated, leading to new or revised KBAs and/or software updates. Over longer periods of time advances in technology lead to new operating systems, computers, and process control system hardware and software offerings (e.g., from the manufacturers and/or software developers), which make their way into existing process control systems through expansions, migrations and modernization projects. Further, a newly detected health condition may activate an open action alert. A newly detected non-operational process (or one at substantial risk of non-operational status) or a newly detected impaired or jeopardized operation may activate an open service call. Further, although generally longer term, hardware and/or software components of the process control system "age" either with time, newer versions, etc. such that eventually it may become obsolete, discontinued, and/or unsupported. Thus, generally speaking, new risk factors may be introduced continually (e.g., daily), whether they are general risk factors or specific risk factors.

Regardless of whether they are general risk factors or specific risk factors, actionable risk factors introduced to the process control system are counted towards the risk assessment (block 512). If there is another risk factor to consider for the process control system (block 514), the example method reverts control back to block 506 for consideration of the next risk factor. Else, the example method determined whether there is another monitored process control system for which to assess a risk assessment (block 516). If so, control reverts to block 502 to retrieve the risk factors for the next monitored process control system. Else, the example method ends for that period, to be executed automatically by the risk assessment and scoring evaluator 310 the next period (e.g., daily). The resulting risk assessment for the monitored process control system may be considered a raw risk assessment that is not necessarily indicative of the health of (or risk posed to) the process control system due, in part, to the continuous introduction of risk factors that have not had an opportunity to be addressed, and which are general to all process control systems or at least all peer process control systems. In addition the raw risk assessment may be stored in the post-match/post-score SMS database 224.

Figure 7:
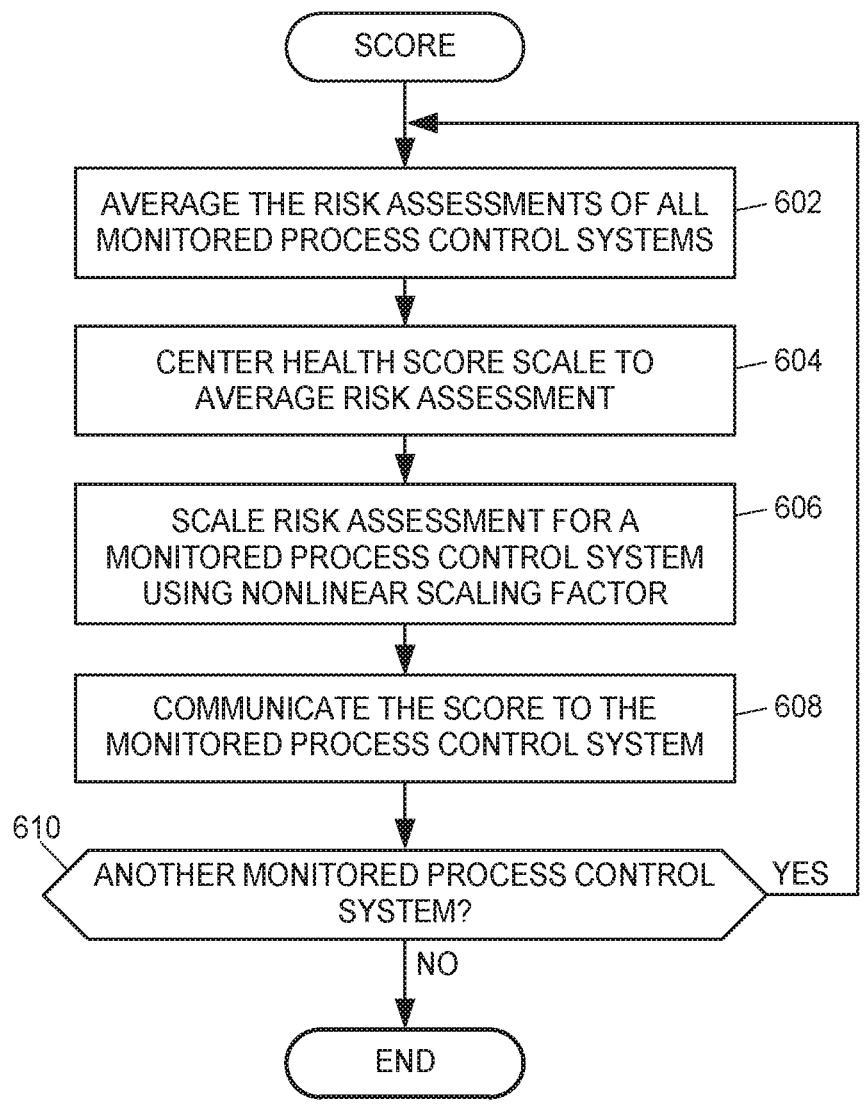
FIG. 7 is a flowchart illustrating an example method that may be used to score the health of each process control system on a health score scale centered to the average risk assessments of the plurality of process control system according to a nonlinear scale.

In order to address the problem of continual introduction of risk factors, FIG. 7 depicts a flow diagram of an example method that may be used to score the health of each process control system. As previously mentioned, continuous introduction of risk factors inflates the risk assessment for a process control system. In many cases, the same risk factors (i.e., general risk factors) apply to multiple all monitored process control systems, or at least all monitored peer process control systems (e.g., all DeltaV™ systems, all Ovation™ systems, all AMS™ systems, etc.) as different types/product families of process control systems may have different risk factors. In other cases, risk factors (i.e., specific risk factors) are for a particular process control system, though not necessarily unique to the process control system. Nonetheless, the continuous introduction of general and specific risk factors may be overwhelming, and lead to low health scores when based solely on the number of risk factors for a given process control system. In turn, there is little to no change (or negative change) in the health score of the process control system, leading to risk factors not being addressed. Unaddressed risk factors decrease the reliability, security and performance of the process control system. The following example method of FIG. 7 will be described in relation to multiple monitored process control systems, such as the process control systems of sites 110-126, though it will be understood by those of ordinary skill in the art that the example method may be equally applicable to monitored peer process control systems, such as the process control systems 110-114 or process control systems to which the risk factors apply.

Turning to FIG. 7, the example method may average the raw risk assessments from the example method of FIG. 6 and the risk assessment of all monitored process control systems or at least all monitored peer process control systems (block 602). In particular, the risk assessment and scoring evaluator 310 (FIG. 4) retrieves the risk assessments for the process control systems from, for example, the post-match/post-score SMS database 224 (FIG. 3). The risk assessment and scoring evaluator 310 then averages the risk assessment. Alternatively, the risk assessment and scoring evaluator 310 may determine the median of the risk assessments among the monitored process control systems.

The risk assessment and scoring evaluator 310 then calibrates a health score scale to the average (or median) risk assessment of the monitored process control systems (block 604). The health score scale may be fixed and bounded, such that it has upper and lower limits. In an example, the health score scale may be defined from 0 to 10, with "0.0" being the lower limit indicative of a very poor health score, and "10.0" being the upper limit indicative of a very good health score. To achieve a fixed scale, a logarithmic distribution or scaling may be applied to the average risk assessments, because there is no maximum to the potential number of unaddressed risks. As a result, a very good health score (e.g., approaching the upper limit) can be achieved without complete elimination of all risk factors. Likewise, a very poor score (e.g., approaching the lower limit) is not significantly improved by addressing just one risk factor when a multiple risk factors remain unaddressed. In this example, the health score scale is linear, though logarithmic scales may also be used for a wide range of scores that are not readily represented by a bounded, linear health score scale.

Figure 14:
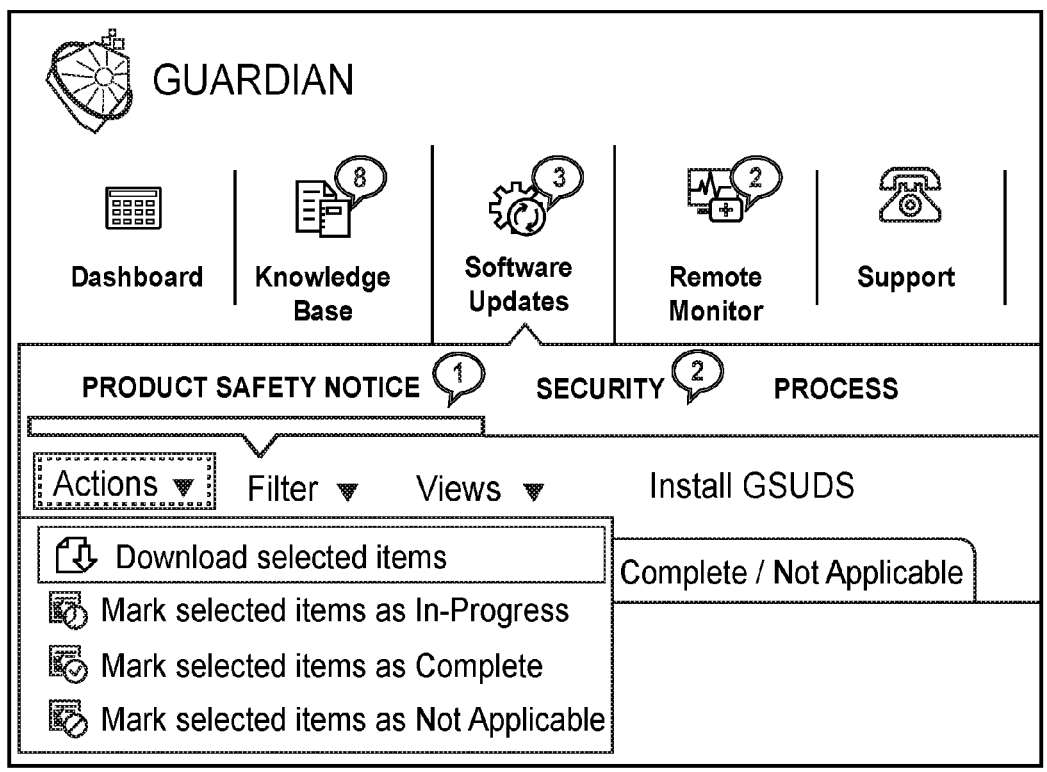
FIG. 14 is a graphical user interface of an example software update risk factor elimination screen that may be used to improve the health score for a process control system of FIG. 2.

The health score scale is calibrated so that a center scale score (e.g., "5.0") conforms to the average (or median) of the risk assessments of the monitored process control systems. In particular, a calibration factor may be determined by logarithmically (e.g., with a natural logarithm) scaling the average risk assessment of the monitored process control systems. For example, the calibration factor may be represented as: $N=\ln(0.5)/Risk_{Avg}$, where N is the calibration factor, 0.5 represents the center of a linear scale, and $Risk_{Avg}$ represents the average raw risk assessment for all monitored process control systems. The calibration factor calibrates the health score scale to the average risk assessment of the monitored process control systems. Thus, the center scale score of the health score scale is achieved when the unaddressed risks to a process control system are at the midpoint of all monitored process control system health scores. The score is particularly useful when managing multiple systems process control systems (e.g., process control systems within a single site or a single business entity) as shown in FIG. 14, where a broad-based prioritization aid is desired.

Furthermore, risk factors introduced to all monitored process control systems at the same time or within a short range of time (e.g., general risk factors), have no effect on any individual process control plant, at least until the risk factor remains unaddressed as compared to other process control plants that have eliminated the risk factor. For example, a Microsoft® security update for all Windows™ operating systems, which theoretically affects all process control systems at the same time, does not worsen the score for any particular process control system, because it applies to all process control systems at the same time, or at least within the same time period in which a health score scale recalibrated and health scores are calculated (e.g., daily). On the other hand, risk factors that apply only to a particular monitored process control system, or less than all of the monitored process control system, (e.g., specific risk factors) may have an effect on that process control system's health score.

The risk assessment and scoring evaluator 310 then determines the health score for each individual process control system (block 606). The process control system health score measures how well risks to the process control system's safety notice, security and process are being managed. The fewer the number of open or unaddressed risks to the process control system, the better the score. In particular, a nonlinear scaling factor and the calibration factor are applied to the raw risk assessment for the process control system. Again, the calibration factor negates the effects of risk factors introduced to all, or substantially all, monitored process control systems, leaving only the risk factors introduced to particular monitored process control systems as having an effect on that process control system's health score.

The nonlinear scaling factor allows for more movement for process control systems scored toward the center of the health score scale than for process control systems scored towards the upper or lower limits of the health score scale. For example, using an exponential scale between zero and one, the score=10*e^(N*Risk), where "10" is a scaling factor according to the upper limit of health score scale, N is the calibration factor and Risk is the raw risk assessment of the monitored process control system. This creates a bell curve distribution, such that a monitored process control system may see a greater change in its health score scale towards the midrange of the health score scale from one period to the next (e.g., at the risk assessments and health scores are re-evaluated daily). On the other hand, a monitored process control system that has a health score towards the upper or lower limits of the health score scale will not see as much change from one period to the next.

The health score for the monitored process control system may be stored in the post-match/post-score SMS database 224, and communicated to the monitored process control system via the web interface 232, the automailer 234, and/or the RSS fee interface 236 (block 608). Thereafter, if the example method determines there is another monitored process control system for the example method to score (block 610), control reverts back to block 606 to scale the risk assessment for the next monitored process control system. Else, the method may end.

Although the maintenance information and the services provided by the example remote maintenance system 102 can be accessed using any type of software program described above, for purposes of simplicity, the example methods and systems are described below in connection with web pages that may be rendered using web browser applications executed by any of the workstation terminals 13, or other computing device with access to the remote maintenance system 102, namely authorization to access information about a particular process control system, or particular ones of the process control systems, registered with the remote maintenance system 102. In the example implementations described herein, the web pages used to provide the example graphical user interface screens described below are served by the web page server 106 of FIG. 2 using, for example, active server page ("ASP") technology. In addition, the maintenance information, services, and features provided via the example graphical user interface screens may be retrieved from data structures stored in one or more of the main server 104, the web page server 106, and the SMS server 108 of FIG. 2.

Figure 8:
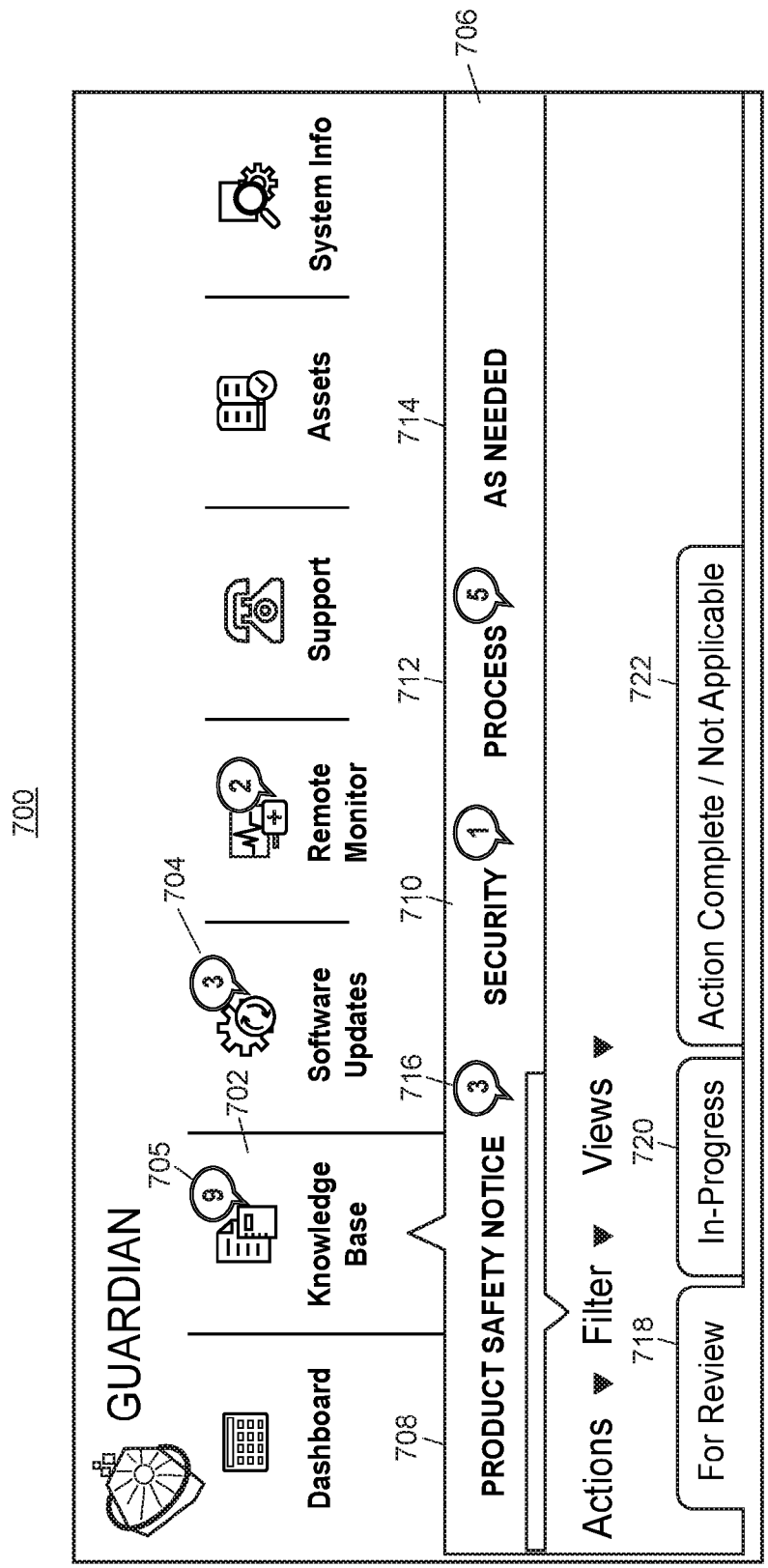
FIG. 8 is a graphical user interface of an example health management task screen that may be used to display health tasks corresponding to a process control system of FIG. 2.

A main screen 700 is depicted in detail in FIG. 8. In the illustrated example of FIG. 8, the main screen 700 is implemented using a portal type of web page providing links to various risk factors and risk factor management options provided by the example remote maintenance system 102. The main screen provides the primary interface for managing system health management tasks, supported by optional automated email notifications (e.g., the automailer 234 and periodic System Analysis Reports (SAR). The most common tasks are to act on KBAs and apply software updates, which are represented by selectable tabs 702, 704, respectively. Each selectable tab 702, 704 may include a notice 705 indicating whether there are any risk factors of that type and the number of risk factors. KBAs and software updates that match process control system content may be organized under four categories: 1) Product Safety Notice—Issues with the potential to affect safety; 2) Security—Issues affecting security; 3) Process—Issues known to have disrupted process control; 4) As Needed—Other issues that may affect the system, such as configuration or migration. Each category may be associated with a selectable tab 708-714, and include a notice 716 indicating whether there are any risk factors associated with the category and the number of risk factors. A customer user 226 may access risk factor information, risk services, or maintenance features associated with each of the represented process control systems by selecting respective ones of the tabs 702, 704. As shown, selecting the KBA tab 702 pertaining to product safety notices 704 causes the main screen 700 to display a plurality of selectable tabs 706 pertaining to the categories.

To manage the disposition of Knowledge Base Articles and software updates, an efficient three-state tracking scheme is provided, to distinguish items to be reviewed, items in progress and items that the customer user 226 completes or determines are not applicable to the system's particular hardware or software configuration/application. A customer user 226 may access information about each risk factor category via selectable tabs showing which risk factors are unaddressed ("For Review" 718), being addressed ("In-Progress" 720) and addressed ("Action Complete/Not Applicable" 722). Again, unaddressed risk factors are considered as introduced risk factors that remain unaddressed, whereas risk factors being address or addresses are considered eliminated risk factors.

A disposition management screen is shown in FIG. 9, which may be generated as a result of selecting one of the tabs 718-722. Referring to FIG. 9, a risk factor information may be organized according to identification 724 ("KBA Number"), symptoms 726 ("System Behavior"), applicability 728 ("Applicability/Likelihood"), way to address the risk 730, 732 ("Recovery/Workaround" and "Avoidance/Resolution"), the number of affected components within the process control system 734 ("Affected Nodes") and corresponding notes 736 ("User Notes"). As seen from FIG. 9, each category for each risk factor includes detailed information for the customer user 226 to assess the risk factor, its ramification and how to address the risk factor.

Figure 10:
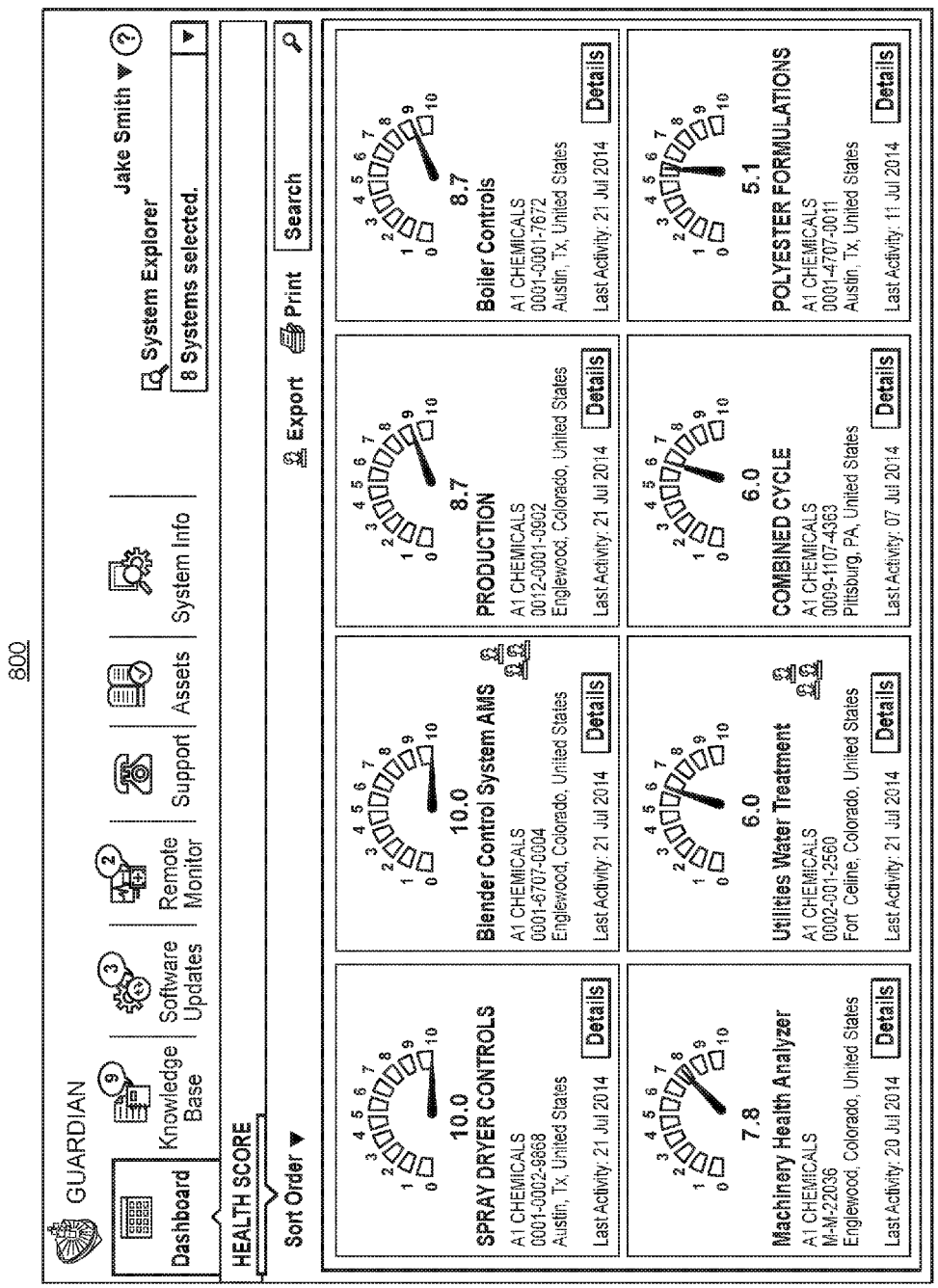
FIG. 10 is a graphical user interface of an example health system score screen that may be used to display the health score for multiple process control systems within an enterprise.

In order for a customer user 226 to view the health score for process control system(s) under the customer user's 226 observation and responsibility as registered with the remote maintenance system 102, a main health score screen 800 may be provided as depicted in FIG. 10. As shown in FIG. 8, several process control systems may be selected, if the customer user 226 has authorization to access the health scores for multiple process control system. Generally speaking, the process control systems are within the same site and/or within the same enterprise. The main health score screen allows a customer user 226 to readily view the health score of the process control system using graphics that clearly display the information in a simple, efficient and coherent manner to allow the customer user 226 to assess the reliability, security and performance of the process control system at a glance. Each process control system may be represented as selectable graphical representation of its health score, as well as associated identification information, including process control system product family.

Figure 11:
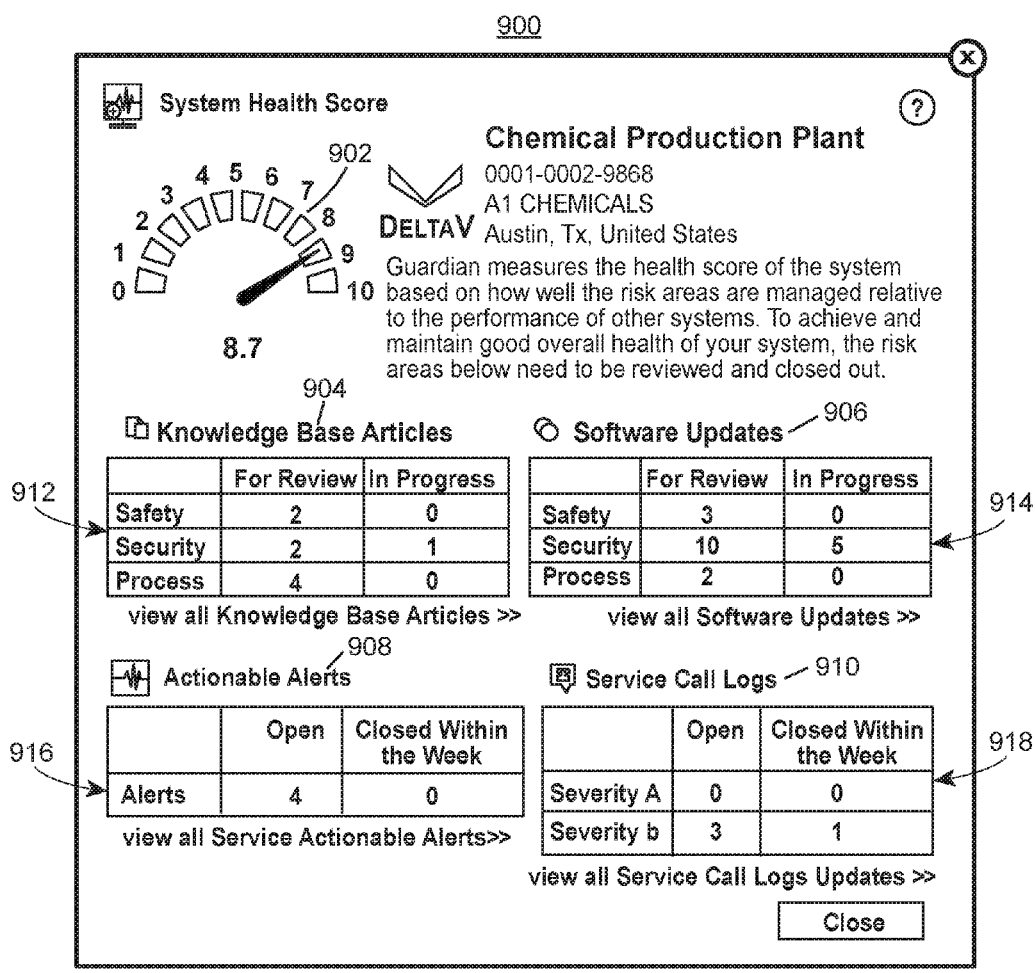
FIG. 11 is a graphical user interface of an example health system score screen that may be used to display the health score for a process control system of FIG. 2.
Figure 12:
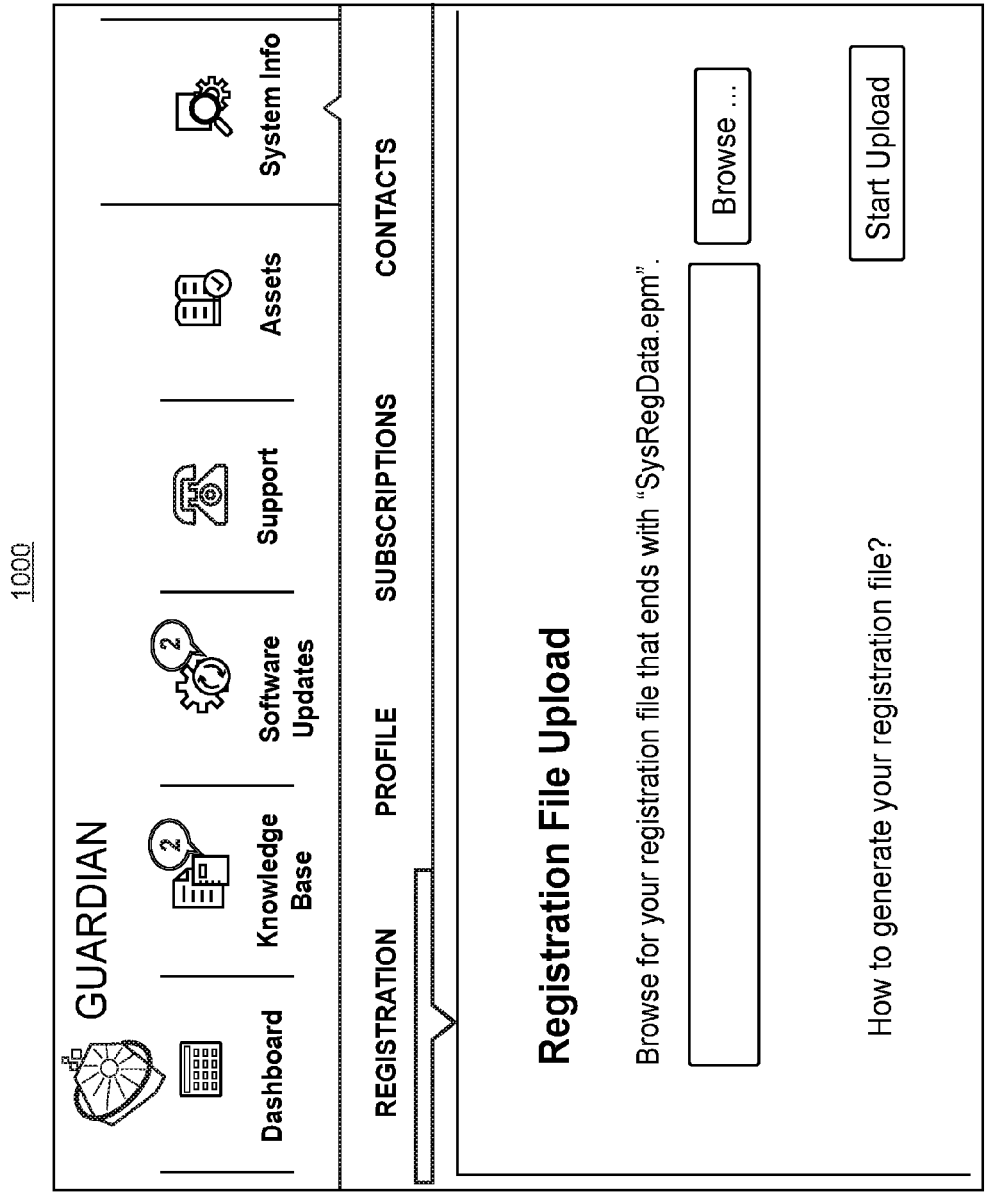
FIG. 12 is a graphical user interface of an example system registration upload screen that may be used to improve the health score for a process control system of FIG. 2.

To view more particular information about a process control system and the risk factors leading to the health score, the graphical representation of a particular process control system may be selected to generate a process control system health score screen 900, as depicted in FIG. 11. Referring to FIG. 11, the process control system health score screen 900 presents the overall health score for the process control system 902 as in FIG. 10, and each of the different risk factor types (e.g., KBAs 904, software updates 906, action alerts 908, service calls 910). Each risk factor type includes subcategories according to the type of KBA 912, the type of software update 914, the type of alert 916 and the type of service call 918, as described above, and the number of risk factors associated with each subcategory.

In order to eliminate risk factors or otherwise take steps towards eliminating risk factors, in a timely manner and achieve greater system safety, security and performance, and, in turn, improve the health score for a process control system, the website may provide various screens as depicted in FIGS. 12-15. For example, in FIG. 12 a registration upload screen 1000 is provided, whereby a customer user 226 may upload a new process control system registration file to the remote maintenance system 102 after installing software updates or making other system content changes. The remote maintenance system 102 uses this information to identify required (uninstalled) updates. The installation of a software update may also eliminate a related Knowledge Base Article. The registration process (e.g., updating the remote maintenance system 102 with new or updated process control system components, configurations, etc.) may be similar or the same as that describe above.

Figure 13:
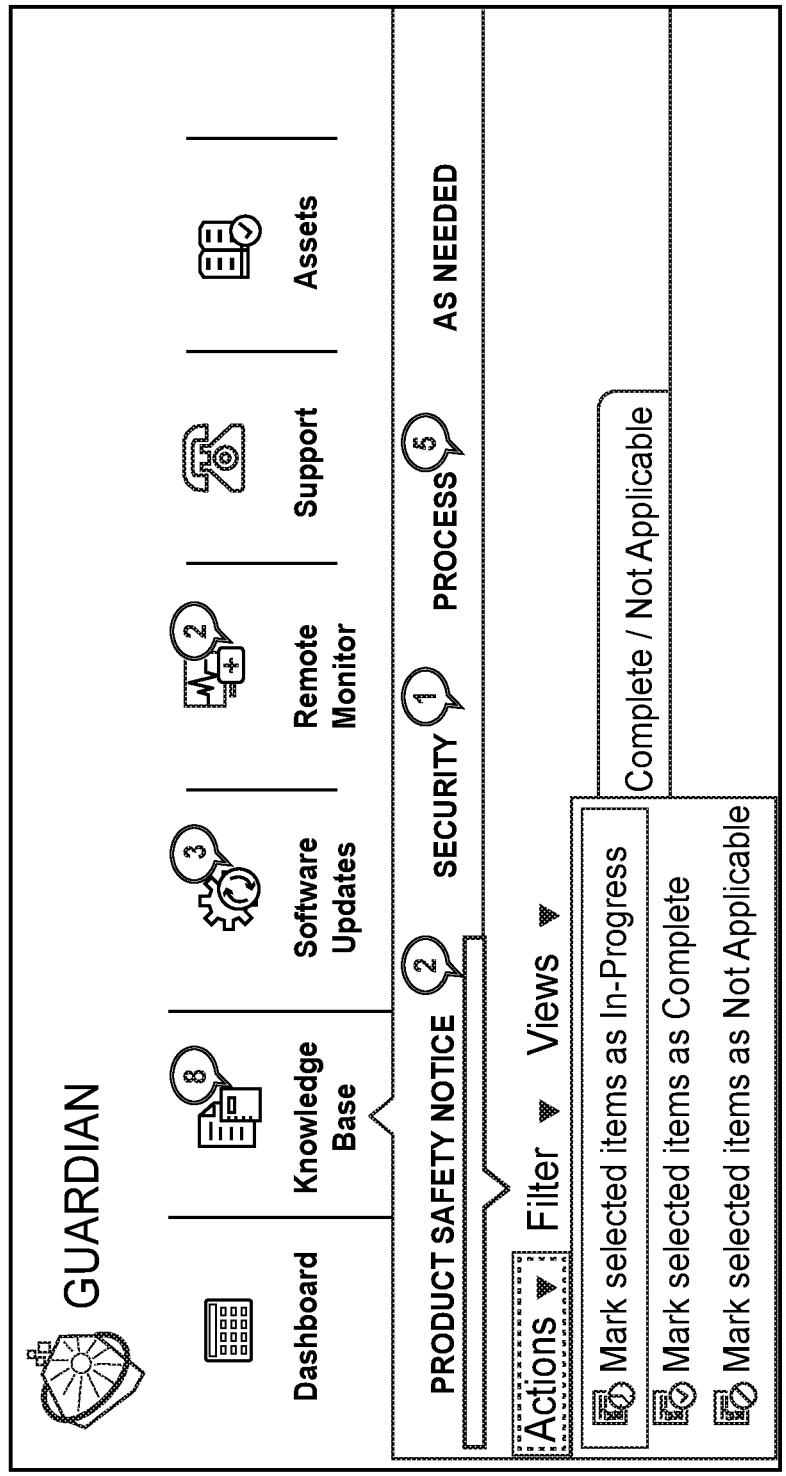
FIG. 13 is a graphical user interface of an example knowledge base article factor elimination screen that may be used to improve the health score for a process control system of FIG. 2.

Some Knowledge Base Articles require local on-site action at the process control system to determine if an issue is relevant or confirm that action has been taken. For example, a KBA may require physical hardware inspection or review of the process control system's control configuration to determine if the issues triggering the conditions are present. Once accomplished, the article's status may be updated by a customer user 226 by a selectable tab ("Actions") for KBAs as shown in FIG. 8. As depicted in FIG. 13, selection of the Actions tab may generate a pull-down menu of various options for updating the status of the KBA (or other risk factor). As discussed above, items with a status of In-Progress, Complete or Not Applicable are no longer considered a risk in the health score for the process control system.

Some security updates for a computer's operating system or applications are only relevant if setup in a certain way that the process control system registration utility (and therefore the remote maintenance system 102) cannot detect. Thus, it is sometimes possible that the remote maintenance system 102 can show an update is approved to install, where it is not actually installable. Or, there may be certain computers or updates where a customer user 226 has taken other actions to mitigate risk or determined there is no risk. The software update's status may be updated by a customer user 226 by a selectable tab ("Actions") for software updates. As depicted in FIG. 14, selection of the Actions tab may generate a pull-down menu of various options for updating the status of the software update. As discussed above, items with a status of In-Progress, Complete or Not Applicable are no longer considered a risk in the health score for the process control system.

Additional considerations for improving the health score for a process control system include addressing service calls, alerts, automated notifications and review of System Analysis Reports, each of which does not require further disclosure by way of illustration. As discussed above, open service calls may be separately categorized and weighted. For example, an "Open Category A" or "Open Category B" service calls signify a serious risk. To close these calls or alerts requires the involvement of the service engineer assigned to the call. Once closed, or downgraded to an operational impact category less than a "B", the risk is eliminated and the health score is improved. A customer user 226 may also sign-up for automated notification emails from the remote maintenance system 102 to ensure awareness of new system health risks as they are identified. System Analysis Reports recap a process control system's service history, which can provide important service trends and help identify longer term system sustainability risks—the effects of product lifecycle status changes—not considered in the process control system health score, but which nonetheless have a proactive effect on maintaining the health of the process control system.

As referenced above, FIG. 10 depicts a graphical user interface of an example health system score screen that may be used to display the health score for multiple process control systems within an enterprise. In that particular case, the customer user 226 is able to view the health score for all process control systems within his/her realm of observation and responsibility as registered with the remote maintenance system 102. That is, the example enterprise has a relatively limited number of process control systems (i.e., eight). In other cases, however, an enterprise may have dozens or hundreds of process control systems that may be distributed throughout the world, which makes it nearly impossible for a customer user 226 to readily monitor all or a substantial portion of the process control systems within the enterprise. For example, a customer user 226 that needs to monitor process control systems within a particular region of the world (e.g., all enterprise process control systems in North America) has a realm of observation and responsibility for dozens of process control systems, which cannot all be displayed on a single screen in a meaningful manner due to the sheer number of individual health scores for the customer user 226 to manage, and due to limitations in the display (e.g., presentation of overall health scores for process control systems cannot all be displayed on a single screen in a meaningful manner due to screen size and resolution).

Figure 16:
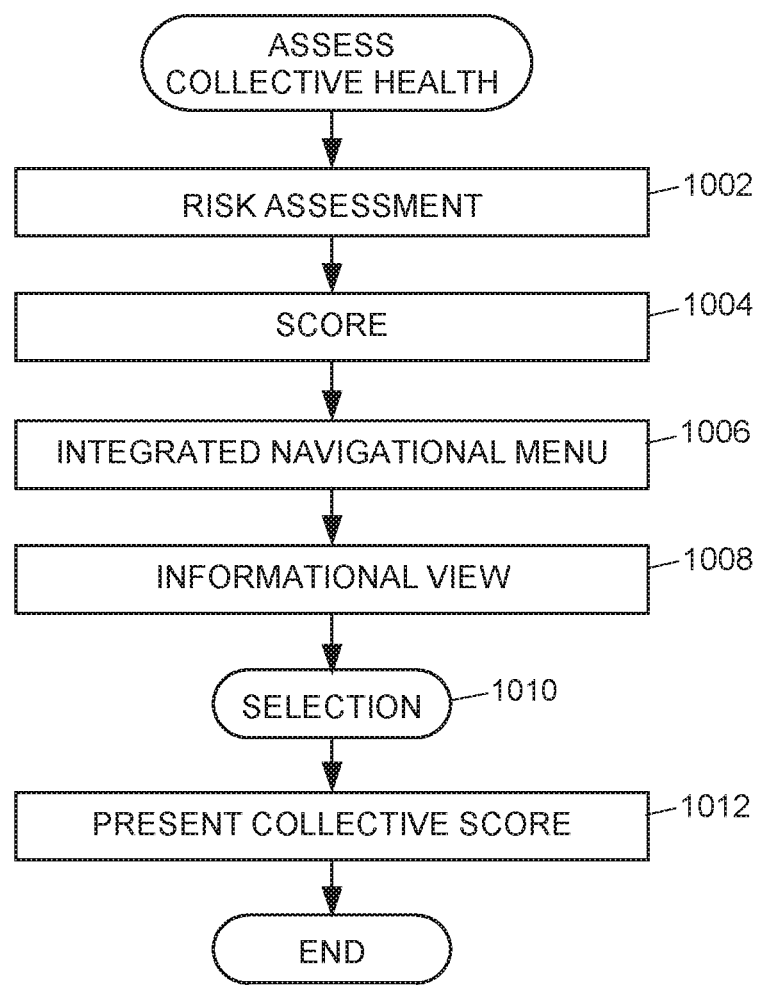
FIG. 16 depicts a flow diagram of an example method that may be used to assess the health of multiple process control systems.

In order to assess the health of multiple process control systems, FIG. 16 provides a routine for assessing the collective health of multiple process control systems at varying levels of integration, from which a customer user 226 may then "drill" up or down to varying levels of integration of process control systems within an enterprise. In one example, levels of integration of process control systems within an enterprise may be defined according to: 1) enterprise; 2) geographic area; 3) location; and 4) product line. The enterprise level includes all process control systems of an enterprise worldwide. The geographic area level includes all process control systems within a particular geographic area of the world, which may be defined according to standard geographic boundaries (e.g., North America, South America, Middle East, etc.) or according to geographic boundaries as defined by the enterprise (e.g., eastern United States as defined by an area east of the Mississippi river). The location level includes all process control systems at a particular location, such as at a plant location (e.g., a process plant in Austin, Tex.). In many cases, the location level may include only one process control system, though some plant location may utilize multiple process control systems. The product line level includes all process control systems belonging to a particular product family of the process control system manufacturer. For example, all DeltaV™ systems, all Ovation™ systems, all AMS™ systems, etc.

Referring to FIG. 16, assessing the collective health begins with a risk assessment 1002 to determine a risk assessment for each of the process control systems within the enterprise. In particular, the risk assessment 1002 may be executed using the risk assessment of FIG. 6. As with the risk assessment of FIG. 6, the risk assessment 1002 may retrieve risk factors matched to each process control system from the example method of FIG. 5. To summarize, the risk assessment and scoring evaluator 310 retrieves the risk factors 212 matched to the process control system (block 502), and obtains the previous risk assessment for the monitored process control system from the match and health score interface 312 (block 504). The risk assessment and scoring evaluator 310 then determines whether the retrieved risk factor has been eliminated (block 506). If the risk factor is eliminated, its weight value is subtracted from the risk assessment for the process control system, or subtracted from the previous risk assessment (block 508). The risk assessment and scoring evaluator 310 then determines whether the retrieved risk factor has been introduced (block 510), and actionable risk factors introduced to the process control system are counted towards the risk assessment (block 512). Then the next risk factor for the process control system is considered (block 514), or the next monitored process control system is assessed for risk (block 516).

After the risk assessment 1002, a health score for each process control system in the enterprise is determined 1004. In one example, the health of each process control system on a health score scale is centered to the average risk assessments of the plurality of process control system according to a nonlinear scale as disclosed with reference to FIG. 7. To summarize, the risk assessments from block 1002 may be averaged (block 602), and the risk assessment and scoring evaluator 310 then calibrates a health score scale to the average (or median) risk assessment of the monitored process control systems (block 604). As above, the health score scale may be fixed and bounded, such that it has upper and lower limits, and to achieve a fixed scale, a logarithmic distribution or scaling may be applied to the average risk assessments, such that a very good health score (e.g., approaching the upper limit) can be achieved without complete elimination of all risk factors, and a very poor score (e.g., approaching the lower limit) is not significantly improved by addressing just one risk factor when a multiple risk factors remain unaddressed. The risk assessment and scoring evaluator 310 then determines the health score for each individual process control system (block 606), where the health score measures how well risks to the process control system are being managed. The health score for the monitored process control system may be stored in the post-match/post-score SMS database 224, and communicated to the monitored process control system via the web interface 232, the automailer 234, and/or the RSS fee interface 236 (block 608). Thereafter, the next monitored process control system is scored (block 610).

Once the risk assessments and scores have been determined for each of the process control systems in the enterprise, an integrated navigation menu may be displayed 1006 specifying higher and lower levels of integration of the health scores, and to allow the customer user 226 to select a level of integration (e.g., enterprise, geographic area, location, product line, etc.) in order to view the collective health score for that level of integration (e.g., the collective health of process control systems in an enterprise, the collective health of process control systems within a geographic area, etc.). Generally speaking, the integrated navigation menu organizes the health scores to allow the customer user 226 to view or access the collective health scores in a consistent and integrated organizational manner that can be used to provide a common viewing platform with respect to the health scores generated in or using a single navigation menu. In particular, the technique of FIG. 16 automatically generates a navigation menu to be used in, for example, the web interface 232 by all customer users 226 authorized to view and access the health scores of one or more of the levels of integration. In effect, the navigation tree menu in conjunction with the post-match/post-score SMS database 224, provide a higher level integration platform, which receives and organizes health scores for multiple process control systems at varying levels of integration or hierarchy within the enterprise.

In addition to the navigation menu, an information view or section may be presented 1008 to a customer user 226 to provide integrated viewing of collective health scores from the post-match/post-score SMS database 224. In one example, the navigation menu section having a navigation menu with headings (e.g., "Enterprise," "World Area," "Location," and "Product Line") is presented with the information view which provides information about the collective health of the selected level of integration within the navigation menu.

Figure 17:
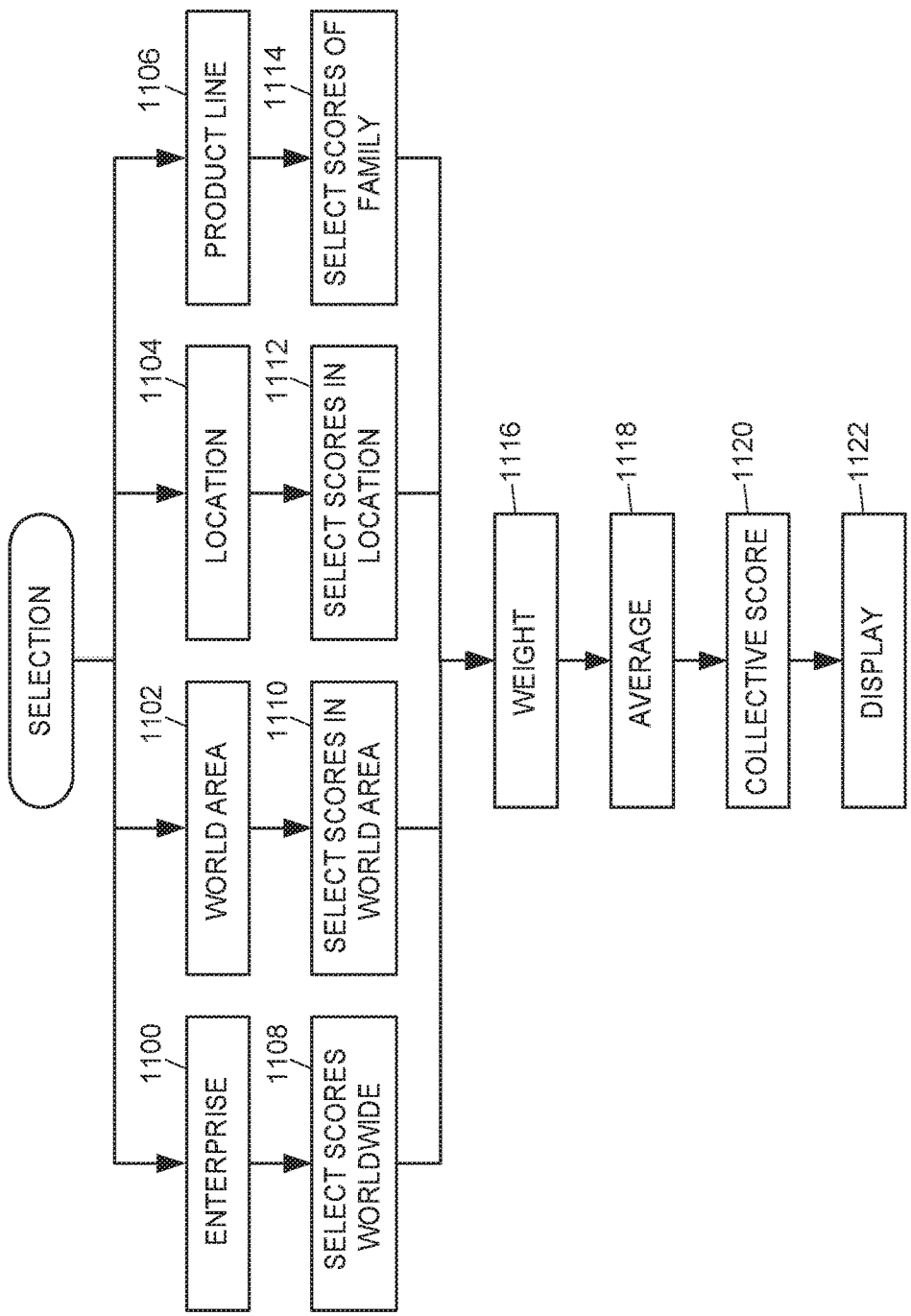
FIG. 17 depicts a flow diagram of an example method that may be used to move between higher and lower levels of integration within an enterprise to assess the collective health of process control systems at each level.

A customer user 226 may then make a selection 1010 from the navigation menu to view the collective health of multiple process control systems at a desired level of integration. Referring to FIG. 17, in the above example of a navigation menu with headings "Enterprise," "World Area," "Location," and "Product Line," a customer user 226 may select one of Enterprise 1100, World Area 1102 (also referred to above as geographic area), Location 1104 and Product Line 1106. Of course, the selection options may depend on the various levels of integration presented in the navigation menu and/or the customer user's authorized scope of access within the remote management system. For example, some users within an enterprise may only be authorized to view a particular level of integration (e.g., only enterprise, only a world area, etc.) In other cases, users may be authorized to view a particular level of integration and all lower levels of integration (e.g., a specified world area and all locations within the specified world area), but not higher levels of integration (e.g., enterprise).

Based on the selection 1100-1106 by the customer user 226, the health scores for all process control systems within the selected level of integration are selected 1008-1114. For example, for the enterprise level of integration, the individual health scores for all process control systems world-wide for that business entity are selected 1008. Similarly, for the world area level of integration, the individual health scores for all process control systems within a selected geographic area(s) for that business entity are selected 1010. In one example, the selection of a world area 1102 may specify a particular world area (e.g., North America), with health scores selected 1110 only for process control systems in North America. In another example, the selection of the world area 1102 may result in selection all health scores for various geographic areas within the customer user's authorization, though grouped by geographic area (e.g., North America, South America, Middle East, etc.).

Likewise, for the location level of integration, selection of a location 1104 may specify a particular location, with health scores selected 1112 only for process control systems at the selected location (e.g., only process control systems at a plant in Austin, Tex.). Alternatively, the selection of a location may result in selection of all health scores for various locations within the customer user's authorization, though grouped by location (e.g., group scores for process control systems at plants in Austin, Tex. and group scores for process control systems at plants in Melbourne, Australia) or within a particular geographic area (e.g., group scores for all process control systems at plants in North America).

Selection of a line of process control system products 1106 may specify a particular product family resulting in health scores for only that product family being selected 1114 (e.g., only DeltaV™). Alternatively, the selection of a product line may result in selection of all health scores for a particular location, geographic area or in an enterprise, but grouped by product line (e.g., all DeltaV™ systems in the enterprise, all AMS™ systems in the enterprise, etc.).

Once the health scores for process control systems within a level of integration have been selected 1108-1114, the health scores for each process control system may be weighted. In one example, the health scores may be weighted equally (or not weighted). However, it is often the case that some process control systems are considered more important or critical to a customer user or business entity than other process control systems. In one case, the customer user may deem one or more process control systems to be more critical to his/her responsibilities and/or operations than other process control systems (e.g., the DeltaV™ systems are considered more critical than the AMS™ systems, or process control systems in the Melbourne, Australia plant are considered more critical than process control systems in the Austin, Tex. plant). In another case, a business entity may consider certain process control systems to be more critical than other process control systems (e.g., based on industry, finances, rate of return, operations, etc.). Accordingly, customer users at different levels (e.g., operations, business, etc.) may differ in terms of which process control systems are more critical based on their respective responsibilities. As such, the health scores of the process control systems may be weighted according to customer-defined criticalities (e.g., based on values assigned by the customer user 226).

In another example, the health scores may be weighted according to the size of each process control system. In particular, it may be assumed that larger process control systems are considered more critical to a user customer or business entity than smaller process control systems. The size of a process control system may be determined in a variety of ways, including, but not limited to the number of device signal tags (DSTs), device tags and/or devices within a process control system. Device signal tags are typically based on the number of device signals within a process plant, which may be measured by the number of inputs from the system I/O, which may be the number of inputs from the controllers, by the number of inputs to a function block, and/or outputs from a function block. Device tags represent the physical addressing of devices within a process control system, and devices within a process system may refer to the number of devices within the process control system. The method by which a process control system is measured may depend on the product line of the process control system. For example, the size of DeltaV™ systems may be measured by DSTs, but not device tags or devices. On the other hand, the size of AMS Device Manager systems may be measured by device tags, but not DSTs or devices, and the size of Ovation™ Machinery Health systems may be measured by the number of Ovation™ Machinery Health devices (e.g., analyzers) in the process control system. As indicated above, it is intended that peer process control systems (e.g., just DeltaV™ systems, just Ovation™ systems, etc.) are used in scoring other process control systems that are members of the same product family of process control systems from a manufacturer, such as process control systems of the same or related product line, based on engineering and design differences in different process control system products. Likewise, weighting and collective scoring of process control systems may be based on peer product control systems within an enterprise. Once the individual health scores are weighted 1116, the example method may average the health scores 1118 to derive the collective health score 1120. Referring back to FIG. 16, the collective health score is then presented to the customer user 226 in the information view 1012 in one or more of the displays disclosed further below.

FIGS. 18-22 are examples of screens that may be implemented using a portal type of web page providing links to various risk factors and risk factor management options provided by the example remote maintenance system 102. The main screen provides the primary interface for managing system health management tasks, and, in particular, monitoring collective health scores at various levels of integration within an enterprise. Notably, while different screens provide different health scores, these views still display the data in a common or consistent format, which makes it easier for the customer user to understand the collective health scores and to navigate through the collective health scores.

Figure 18:
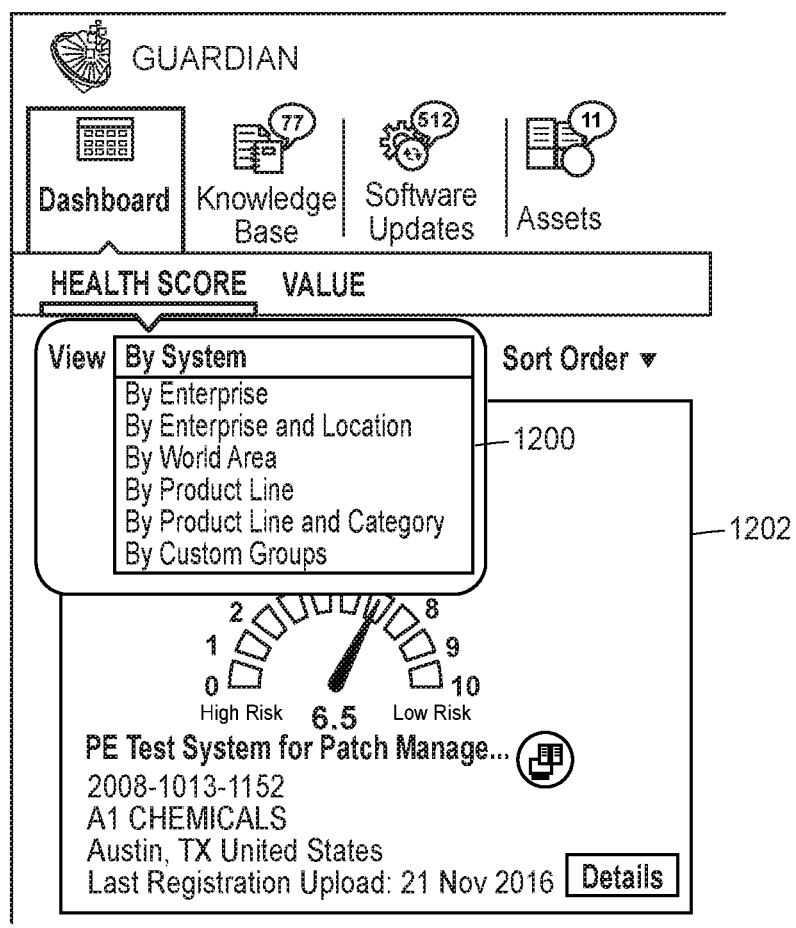
FIG. 18 is a graphical user interface of an example navigation menu having menu items specifying different levels of integration of health scores in an enterprise.

Referring to FIGS. 18-22, each of the screens may be structured with a navigation menu 1200 and an information view 1202. In particular, FIG. 18 depicts a screen to provide integrated viewing of collective health scores from the method of FIG. 16. In particular, the screen display includes a navigation menu section 1200 having a navigation menu with seven headings ("By System," "By Enterprise," "By Enterprise and Location," "By World Area," "By Product Line," "By Product Line and Category," and "By Custom Groups") and an information section 1202 which provides information about the collected health scores of the selected level of integration within the navigation menu section 1200. Because, in the example screen of FIG. 18, the integration level (i.e., "By System") associated with an individual process control system is selected, only a health score for a particular process control system (i.e., "PE Test System For Patch Management") is included in the information section 1202, similar to the presentation of a health score for individual process control systems in FIG. 10.

Figure 19:
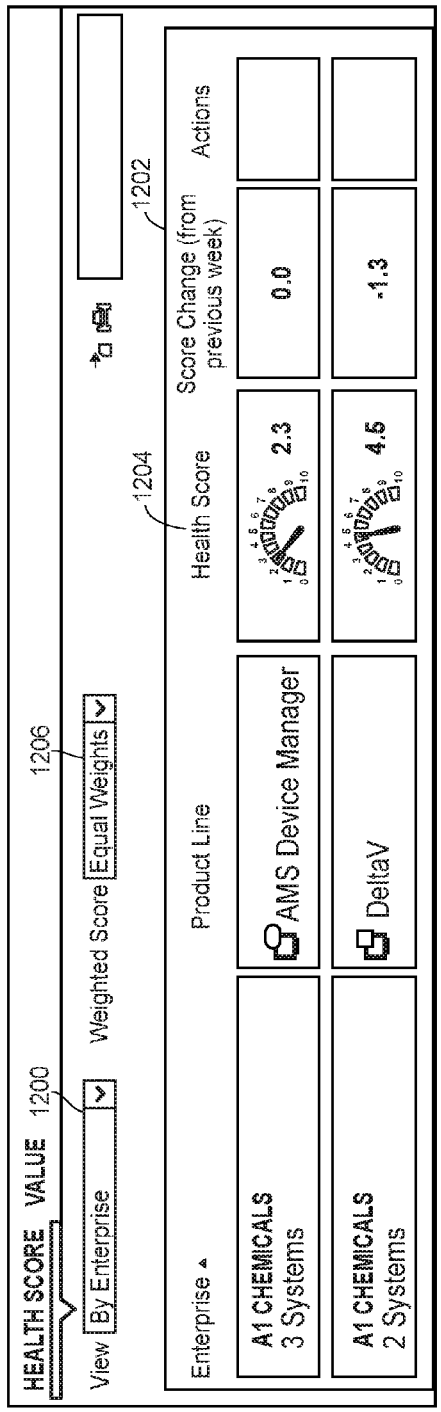
FIG. 19 is a graphical user interface of an example information view depicting an average collective health score for process control systems at an enterprise level.

Referring to FIG. 19, the screen display likewise includes a navigation menu section 1200 having a pull-down navigation menu, which, if expanded, would show other levels of integration as in FIG. 18. The screen also includes an information section 1202. In this particular case, "By Enterprise" is selected from the navigation menu section 1200, such that collective scores are shown in the information section 1202 for the entire enterprise (i.e., "A1 Chemicals"). As mentioned above, only process control systems of the same or related product lines are scored due to engineering and design differences, where a risk factor may be applicable to one type of process control system but not another. As such, the information view 1202 presents the collective health scores at an enterprise level, but separated by product line (i.e., "AMS Device Manager" and "DeltaV"). As seen in FIG. 19, the collective health score 1204 for all AMS Device Manager systems within the enterprise is 2.3 (on a scale of 0.0 to 10.0), which may indicate poor health among these systems, and the collective health score for all DeltaV systems within the enterprise is 4.5, which may indicate fair health among these systems. Also of note is a pull down menu 1206 specifying options for weighting the individual health scores of the process control systems. In this particular example, each of the process control systems within each product line and within the enterprise are given equal weight.

Figure 20:
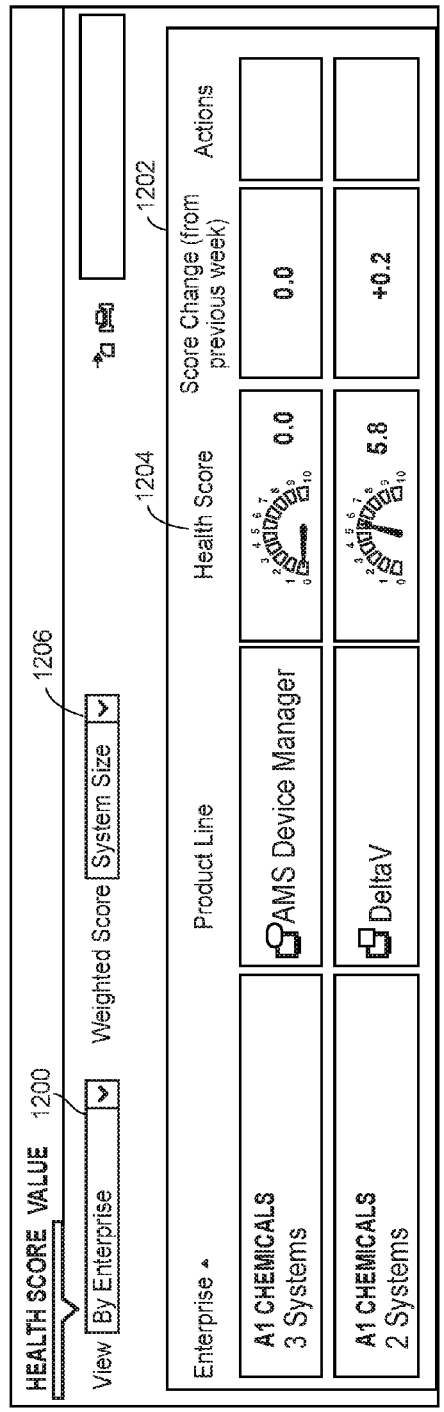
FIG. 20 is a graphical user interface of an example information view depicting a weighted average collective health score for process control systems at an enterprise level.

On the other hand, referring to FIG. 20, the same integration level is shown separated by product line as in FIG. 19, except the "System Size" option is selected from the pull down menu 1206. Using the examples above, the system size for AMS Device Manager systems is measured according to the number of device tags, whereas the system size for DeltaV systems is measured according to device signal tags. As weighted, the collective score for AMS Device Manager systems at the enterprise level is 0.0, thereby indicating not only poor collective health among these systems, but also that larger (e.g. more critical) systems (i.e., more heavily weighted systems) have a poor health score thereby dragging down the score, as compared to the straight average in FIG. 19. By comparison, the weighted collective score for DeltaV systems at the enterprise level is 5.8, thereby indicating not only fair to good collective health among these systems, but also that larger (e.g., more critical) systems have good health, even if some smaller (e.g., less critical) systems have poorer health, as compared to the straight average in FIG. 19.

In each case, the customer user may select (e.g., click on) the health scores to view the health scores of the geographic area, location or systems contributing to the collective health score for the enterprise. For example, the screen of FIG. 21 may be displayed in response to selection of the "World Area" integration level in the navigation menu section 1200 or in response to selecting a health score 1204. Again, the collective health scores at a geographic area level are presented in the information view 1202 and separated by product line, such that AMS Device Manager systems and DeltaV systems have separate collective health scores for the geographical area "Asia Pacific". In this particular case, each geographical area 1208 (i.e., "Asia Pacific," Europe" and "North America") are separated out, though it should also be understood that specific geographic areas may be called out (e.g., showing the collective health score for only "Asia Pacific"). Again, the scores may be weighted according to the option in the pull down menu 1206.

Figures 21, 22:
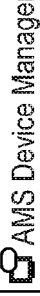
FIG. 21 is a graphical user interface of an example information view depicting a collective health score for process control systems at a geographic area level.
FIG. 22 is a graphical user interface of an example information view depicting a collective health score for process control systems at a product line level.

The screen of FIG. 22 may be display in response to selection of the "Product" line integration level in the navigation menu section 1200 or in response to selecting a product line in a previous screen (e.g., drilling down to process control systems at a product line integration level). Similarly, a customer user 226 may "drill up" from these screen, using, for example, selections from the navigation menu section 1200. In this particular case, the collective health scores by product line are shown at an enterprise level, as can be seen by a comparison between FIGS. 19 and 22, even though "By Product Line" is selected. Accordingly, it should be well-understood that the integration levels are not necessarily static with respect to one another, and different options may be presented in the navigation menu section 1200. For example, a customer user 226 may view collective health scores by product line at an enterprise level, a geographic area level, a location level, etc. As another example, if the levels of integration are also defined by industry, a customer user may view collective health scores by product line for a particular industry at an enterprise level, geographic level, etc.

Figure 23:
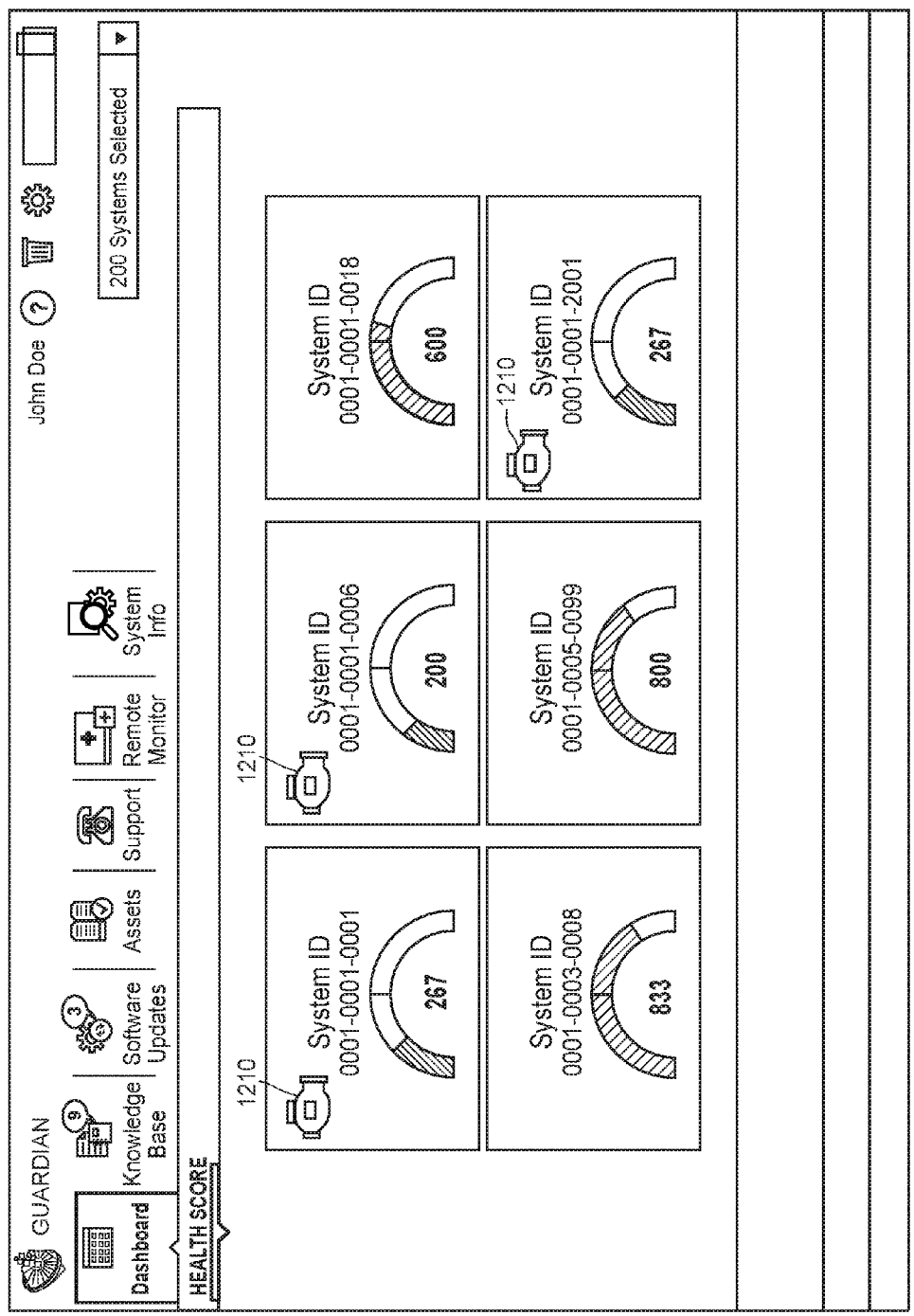
FIG. 23 is a graphical user interface of an example performance screen that may be used to identify underperforming process control systems or sub-systems within a process control system.

Referring to FIG. 23, whereas the above disclosure related to the health of process control systems, either individually or collectively at various levels of integration, the performance of a process control system may also be monitored using the remote management system 102. For example, a process control system may not necessarily have poor health, but may still be underperforming. Generally, the customer users 226 cannot readily ascertain whether a process control system within their scope of responsibility is performing as it should or underperforming (i.e., it could be performing better). For example, a customer user 226 may be unaware that half of a loop is underperforming or turned off due to, for example, variability in the loop, poor hardware, improper hardware (e.g., an oversized valve does not provide the right resolution for control as compared to a properly-sized valve in the loop), due to lack of time, skill, etc. Similarly, a customer user 226 may be unaware of underutilization within a process control system. Accordingly, FIG. 23 is an example of a screen providing an alert 1210 to the customer user 226 that performance or utilization issues exist within a process control system. The user may have the option to ignore the alert or select the alert 1210 to drill down to the cause of the underperformance, underutilization, etc.

Embodiments of the techniques described in the present disclosure may include any number of the following aspects, either alone or in combination:

1. A method of assessing a collective health of a plurality of process control systems comprising: automatically and periodically assessing a risk for each of a plurality of process control systems, wherein each process control system has one or more risk factors associated with the process control system, wherein the introduction of a risk factor to a process control system each period increases the risk assessment for that process control system, and wherein the elimination of a risk factor from a process control system each period decreases the risk assessment for that process control system; scoring the health of each process control system within a health score scale fixed by an upper limit and a lower limit, the health score based on the assessed risk for each process control system; displaying an integrated navigation menu having a plurality of selectable menu items specifying higher and lower levels of integration of the health scores; displaying an information view associated with the navigation menu; enabling a user to select one of the plurality of selectable menu items within the navigation menu to specify higher and lower levels of integration of the health scores; and presenting a collective health score of the process control systems associated with the selected menu item in the information view in a format for each of the different selectable menu items specifying the higher and lower levels of integration of the health scores, wherein the format is a common display format for presenting the collective health scores of the process control systems associated with each of the selectable menu items specifying the higher and lower levels of integration of the health scores.

2. The method according to aspect 1, wherein the same risk factor introduced to each of the plurality of process control systems in a period does not affect the health score of any of the plurality of process control systems, and wherein elimination of a risk factor from a process control system in a period has more of an effect on the health score for a process control system scored towards the center of the health score scale the previous period than for a process control system scored towards the upper and lower limits of the health score scale the previous period.

3. The method according to any one of the preceding aspects, wherein each process control system is located at a plant site geographically separate from other plant sites of the plurality of other process control systems, and wherein a level of integration comprises a geographical area.

4. The method according to any one of the preceding aspects, wherein presenting a collective health score of the process control systems associated with the selected menu item in the information view comprises presenting a collective health score of the process control systems within the selected geographical area.

5. The method according to any one of the preceding aspects, wherein each process control system is a member of a product family of process control systems from a manufacturer, the plurality of process control systems being of two or more different product families, and wherein a level of integration comprises a product family.

6. The method according to any one of the preceding aspects, wherein presenting a collective health score of the process control systems associated with the selected menu item in the information view comprises presenting a collective health score of the process control systems of the same selected product family.

7. The method according to any one of the preceding aspects, wherein each process control system is a member of an enterprise, the plurality of process control systems being of two or more different enterprises, and wherein a level of integration comprises an enterprise.

8. The method according to any one of the preceding aspects, wherein presenting a collective health score of the process control systems associated with the selected menu item in the information view comprises presenting a collective health score of the process control systems of the same selected enterprise.

9. The method according to any one of the preceding aspects, wherein each process control system is a member of the same enterprise, wherein a level of integration comprises the enterprise, and wherein presenting a collective health score of the process control systems associated with the selected menu item in the information view comprises presenting a collective health score of the process control systems of the enterprise.

10. The method according to any one of the preceding aspects, wherein each process control system is a member of a business industry, the plurality of process control systems being of two or more different business industries, and wherein a level of integration comprises a business industry.

11. The method according to any one of the preceding aspects, wherein presenting a collective health score of the process control systems associated with the selected menu item in the information view comprises presenting a collective health score of the process control systems of the same business industry.

12. The method according to any one of the preceding aspects, wherein the collective health score comprises an average of the health scores of the process control systems associated with the selected menu item.

13. The method according to any one of the preceding aspects, further comprising weighting the health score for each process control system, wherein the average collective health score comprises a weighted average.

14. The method according to any one of the preceding aspects, wherein weighting the health score for each process control system comprises weighting the health score for each process control system according to the number of input device signal tags of controllers across the process control system.

15. The method according to any one of the preceding aspects, wherein weighting the health score for each process control system comprises weighting the health score for each process control system according to the number of device tags within the process control system.

16. The method according to any one of the preceding aspects, wherein weighting the health score for each process control system comprises weighting the health score for each process control system according to the number of devices within the process control system.

17. The method according to any one of the preceding aspects, wherein weighting the health score for each process control system comprises weighting the health score for each process control system according to a value assigned by a user of the process control system.

18. An apparatus for assessing a collective health of a plurality of process control systems comprising: a server adapted to register a process control system and a plurality of other process control systems to facilitate maintaining the process control systems, the process control system located at a first plant site geographically separate from other plant sites of other process control systems; an interface in communication with the server and adapted to retrieve risk factors from a database in communication with the server based on monitoring of the process control systems; a communication interface adapted to communicate risk factors to the process control systems, wherein each process control system has one or more risk factors associated with the process control system; and a processor in communication with the interface, the server and the communication interface, the processor adapted to automatically and periodically: score the health of each process control system within a health score scale fixed by an upper limit and a lower limit based on the assessed risk for each process control system; display an integrated navigation menu having a plurality of selectable menu items specifying higher and lower levels of integration of the health scores; display an information view associated with the navigation menu; enable a user to select one of the plurality of selectable menu items within the navigation menu to specify higher and lower levels of integration of the health scores; and present a collective health score of the process control systems associated with the selected menu item in the information view in a format for each of the different selectable menu items specifying the higher and lower levels of integration of the health scores, wherein the format is a common display format for presenting the collective health scores of the process control systems associated with each of the selectable menu items specifying the higher and lower levels of integration of the health scores.

19. The system according to aspect 18, wherein the same risk factor introduced to each of the plurality of process control systems in a period does not affect the health score of any of the plurality of process control systems, and wherein elimination of a risk factor from a process control system in a period has more of an effect on the health score for a process control system scored towards the center of the health score scale the previous period than for a process control system scored towards the upper and lower limits of the health score scale the previous period.

20. The system according to either one of aspect 18 or aspect 19, wherein each process control system is located at a plant site geographically separate from other plant sites of the plurality of other process control systems, and wherein a level of integration comprises a geographical area.

21. The system according to any one of aspects 18-20, wherein the processor is adapted to present a collective health score of the process control systems within the selected geographical area.

22. The system according to any one of aspects 18-21, wherein each process control system is a member of a product family of process control systems from a manufacturer, the plurality of process control systems being of two or more different product families, and wherein a level of integration comprises a product family.

23. The system according to any one of aspects 18-22, wherein the processor is adapted to present a collective health score of the process control systems of the same selected product family.

24. The system according to any one of aspects 18-23, wherein each process control system is a member of an enterprise, the plurality of process control systems being of two or more different enterprises, and wherein a level of integration comprises an enterprise.

25. The system according to any one of aspects 18-24, wherein the processor is adapted to present a collective health score of the process control systems of the same selected enterprise.

26. The system according to any one of aspects 18-25, wherein each process control system is a member of the same enterprise, wherein a level of integration comprises the enterprise, and wherein the processor is adapted to present a collective health score of the process control systems of the enterprise.

27. The system according to any one of aspects 18-26, wherein each process control system is a member of a business industry, the plurality of process control systems being of two or more different business industries, and wherein a level of integration comprises a business industry.

28. The system according to any one of aspects 18-27, wherein the processor is adapted to present a collective health score of the process control systems of the same business industry.

29. The system according to any one of aspects 18-28, wherein the collective health score comprises an average of the health scores of the process control systems associated with the selected menu item.

30. The system according to any one of aspects 18-29, wherein the processor is further adapted to weight the health score for each process control system, wherein the average collective health score comprises a weighted average.

31. The system according to any one of aspects 18-30, wherein the processor is adapted to weight the health score for each process control system according to the number of input device signal tags of controllers across the process control system.

32. The system according to any one of aspects 18-31, wherein the processor is adapted to weight the health score for each process control system according to the number of device tags within the process control system.

33. The system according to any one of aspects 18-32, wherein the processor is adapted to weight the health score for each process control system according to the number of devices within the process control system.

34. The system according to any one of aspects 18-33, wherein the processor is adapted to weight the health score for each process control system according to a value assigned by a user of the process control system.

Although the foregoing text sets forth a detailed description of numerous different embodiments of the invention, it should be understood that the scope of the invention may be defined by the words of the claims set forth at the end of this patent and their equivalents. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A method of assessing a collective health of a plurality of process control systems comprising:
automatically and periodically assessing a risk for each of a plurality of process control systems, wherein each process control system has one or more risk factors associated with the process control system, wherein introduction of a risk factor to a process control system each period increases the risk assessment for that process control system, and wherein elimination of a risk factor from a process control system each period decreases the risk assessment for that process control system;
scoring the health of each process control system within a health score scale fixed by an upper limit and a lower limit, the health score based on the assessed risk for each process control system;
displaying an integrated navigation menu having a plurality of selectable menu items specifying higher and lower levels of integration of the health scores;
displaying an information view associated with the navigation menu;
enabling a user to select one of the plurality of selectable menu items within the navigation menu to specify higher and lower levels of integration of the health scores; and
presenting a collective health score of the process control systems associated with the selected menu item in the information view in a format for each of the plurality of selectable menu items specifying the higher and lower levels of integration of the health scores, wherein the format is a common display format for presenting the collective health scores of the process control systems associated with each of the selectable menu items specifying the higher and lower levels of integration of the health scores.

2. The method of claim 1,
wherein the same risk factor introduced to each of the plurality of process control systems in a period does not affect the health score of any of the plurality of process control systems, and wherein elimination of a risk factor from a process control system in a period has more of an effect on the health score for a process control system scored towards the center of the health score scale the previous period than for a process control system scored towards the upper and lower limits of the health score scale the previous period.

3. The method of claim 1, wherein each process control system is located at a plant site geographically separate from other plant sites of the plurality of other process control systems, and wherein a level of integration comprises a geographical area.

4. The method of claim 3, wherein presenting a collective health score of the process control systems associated with the selected menu item in the information view comprises presenting a collective health score of the process control systems within the selected geographical area.

5. The method of claim 1, wherein each process control system is a member of a product family of process control systems from a manufacturer, the plurality of process control systems being of two or more different product families, and wherein a level of integration comprises a product family.

6. The method of claim 5, wherein presenting a collective health score of the process control systems associated with the selected menu item in the information view comprises presenting a collective health score of the process control systems of the same selected product family.

7. The method of claim 1, wherein each process control system is a member of an enterprise, the plurality of process control systems being of two or more different enterprises, and wherein a level of integration comprises an enterprise.

8. The method of claim 7, wherein presenting a collective health score of the process control systems associated with the selected menu item in the information view comprises presenting a collective health score of the process control systems of the same selected enterprise.

9. The method of claim 1, wherein each process control system is a member of the same enterprise, wherein a level of integration comprises the enterprise, and wherein presenting a collective health score of the process control systems associated with the selected menu item in the information view comprises presenting a collective health score of the process control systems of the enterprise.

10. The method of claim 1, wherein each process control system is a member of a business industry, the plurality of process control systems being of two or more different business industries, and wherein a level of integration comprises a business industry.

11. The method of claim 10, wherein presenting a collective health score of the process control systems associated with the selected menu item in the information view comprises presenting a collective health score of the process control systems of the same business industry.

12. The method of claim 1, wherein the collective health score comprises an average of the health scores of the process control systems associated with the selected menu item.

13. The method of claim 12, further comprising weighting the health score for each process control system, wherein the average collective health score comprises a weighted average.

14. The method of claim 13, wherein weighting the health score for each process control system comprises weighting the health score for each process control system according to the number of input device signal tags of controllers across the process control system.

15. The method of claim 13, wherein weighting the health score for each process control system comprises weighting the health score for each process control system according to the number of device tags within the process control system.

16. The method of claim 13, wherein weighting the health score for each process control system comprises weighting the health score for each process control system according to the number of devices within the process control system.

17. The method of claim 13, wherein weighting the health score for each process control system comprises weighting the health score for each process control system according to a value assigned by a user of the process control system.

18. An apparatus for assessing a collective health of a plurality of process control systems comprising:
    a server adapted to register a process control system and a plurality of other process control systems to facilitate maintaining the process control systems, the process control system located at a first plant site geographically separate from other plant sites of other process control systems;
    an interface in communication with the server and adapted to retrieve risk factors from a database in communication with the server based on monitoring of the process control systems;
    a communication interface adapted to communicate risk factors to the process control systems, wherein each process control system has one or more risk factors associated with the process control system; and
    a processor in communication with the interface, the server and the communication interface, the processor adapted to automatically and periodically:
    score the health of each process control system within a health score scale fixed by an upper limit and a lower limit based on the assessed risk for each process control system;
    display an integrated navigation menu having a plurality of selectable menu items specifying higher and lower levels of integration of the health scores;
    display an information view associated with the navigation menu;
    enable a user to select one of the plurality of selectable menu items within the navigation menu to specify higher and lower levels of integration of the health scores; and
    present a collective health score of the process control systems associated with the selected menu item in the information view in a format for each of the plurality of selectable menu items specifying the higher and lower levels of integration of the health scores, wherein the format is a common display format for presenting the collective health scores of the process control systems associated with each of the selectable menu items specifying the higher and lower levels of integration of the health scores.

19. The system of claim 18,
    wherein the same risk factor introduced to each of the plurality of process control systems in a period does not affect the health score of any of the plurality of process control systems, and
    wherein elimination of a risk factor from a process control system in a period has more of an effect on the health score for a process control system scored towards the center of the health score scale the previous period than for a process control system scored towards the upper and lower limits of the health score scale the previous period.

20. The system of claim 18, wherein each process control system is located at a plant site geographically separate from other plant sites of the plurality of other process control systems, and wherein a level of integration comprises a geographical area.

21. The system of claim 20, wherein the processor is adapted to present a collective health score of the process control systems within the selected geographical area.

22. The system of claim 18, wherein each process control system is a member of a product family of process control systems from a manufacturer, the plurality of process control systems being of two or more different product families, and wherein a level of integration comprises a product family.

23. The system of claim 22, wherein the processor is adapted to present a collective health score of the process control systems of the same selected product family.

24. The system of claim 18, wherein each process control system is a member of an enterprise, the plurality of process control systems being of two or more different enterprises, and wherein a level of integration comprises an enterprise.

25. The system of claim 24, wherein the processor is adapted to present a collective health score of the process control systems of the same selected enterprise.

26. The system of claim 18, wherein each process control system is a member of the same enterprise, wherein a level of integration comprises the enterprise, and wherein the processor is adapted to present a collective health score of the process control systems of the enterprise.

27. The system of claim 18, wherein each process control system is a member of a business industry, the plurality of process control systems being of two or more different business industries, and wherein a level of integration comprises a business industry.

28. The system of claim 27, wherein the processor is adapted to present a collective health score of the process control systems of the same business industry.

29. The system of claim 18, wherein the collective health score comprises an average of the health scores of the process control systems associated with the selected menu item.

30. The system of claim 29, wherein the processor is further adapted to weight the health score for each process control system, wherein the average collective health score comprises a weighted average.

31. The system of claim 30, wherein the processor is adapted to weight the health score for each process control system according to the number of input device signal tags of controllers across the process control system.

32. The system of claim 30, wherein the processor is adapted to weight the health score for each process control system according to the number of device tags within the process control system.

33. The system of claim 30, wherein the processor is adapted to weight the health score for each process control system according to the number of devices within the process control system.

34. The system of claim 30, wherein the processor is adapted to weight the health score for each process control system according to a value assigned by a user of the process control system.

\* \* \* \* \*